United States Patent
Choi

(10) Patent No.: US 11,745,568 B2
(45) Date of Patent: Sep. 5, 2023

(54) VEHICLE DOOR OPENING AND CLOSING APPARATUS

(71) Applicants: Hyundai Motor Company, Seoul (KR); Kia Motors Corporation, Seoul (KR)

(72) Inventor: Je Won Choi, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 408 days.

(21) Appl. No.: 17/014,433

(22) Filed: Sep. 8, 2020

(65) Prior Publication Data

US 2021/0170839 A1 Jun. 10, 2021

(30) Foreign Application Priority Data

Dec. 5, 2019 (KR) .................. 10-2019-0160949

(51) Int. Cl.
| | |
|---|---|
| *B60J 5/04* | (2006.01) |
| *B60J 5/06* | (2006.01) |
| *E05D 15/06* | (2006.01) |
| *E05B 85/10* | (2014.01) |
| *E05B 85/24* | (2014.01) |
| *E05D 15/10* | (2006.01) |
| *E05D 15/48* | (2006.01) |

(52) U.S. Cl.
CPC .............. *B60J 5/047* (2013.01); *B60J 5/06* (2013.01); *E05B 85/10* (2013.01); *E05B 85/243* (2013.01); *E05D 15/0604* (2013.01); *E05D 15/1047* (2013.01); *E05D 2015/485* (2013.01); *E05Y 2201/64* (2013.01); *E05Y 2201/684* (2013.01); *E05Y 2900/531* (2013.01)

(58) Field of Classification Search
CPC . B60J 5/047; E05D 15/1047; E05D 2015/485
See application file for complete search history.

(56) References Cited

U.S. PATENT DOCUMENTS

| | | | |
|---|---|---|---|
| 8,646,208 B2* | 2/2014 | Taracko | B60J 5/047 49/155 |
| 11,607,935 B2* | 3/2023 | Lee | B60J 5/105 |
| (Continued) | | | |

FOREIGN PATENT DOCUMENTS

| | | | |
|---|---|---|---|
| DE | 10 2012 004 818 | * | 9/2013 |
| KR | 20210057616 A | | 5/2021 |

*Primary Examiner* — Gregory J Strimbu
(74) *Attorney, Agent, or Firm* — Slater Matsil, LLP

(57) ABSTRACT

A vehicle door opening and closing apparatus includes a rail mounted on a vehicle body, a roller unit mounted on a vehicle door, the vehicle door having a main latch releasably engaged with a main striker mounted on the vehicle body, the roller unit configured to allow the vehicle door to open and close in a sliding mode and a swing mode, and an outside handle operatively connected to the main latch, and including a handle base mounted on the vehicle door and a handle grip movably mounted on the handle base, wherein the handle grip is slidable in a longitudinal direction of the vehicle body, and pivotal in a transverse direction of the vehicle body, and wherein as the handle grip slides, the sliding mode is selected, and as the handle grip pivots, the swing mode is selected.

20 Claims, 33 Drawing Sheets

(56) References Cited

U.S. PATENT DOCUMENTS

| | | | |
|---|---|---|---|
| 2003/0218358 A1* | 11/2003 | Hahn | B60J 5/047 296/155 |
| 2016/0272054 A1* | 9/2016 | Maruyama | B60J 5/06 |
| 2019/0031000 A1* | 1/2019 | Houmani | B60J 5/0486 |
| 2021/0138880 A1* | 5/2021 | Lee | E05B 83/40 |
| 2021/0140206 A1* | 5/2021 | Lee | E05B 83/38 |
| 2021/0140215 A1* | 5/2021 | Choi | E05B 83/38 |
| 2021/0140216 A1* | 5/2021 | Choi | E05D 15/1042 |
| 2021/0170842 A1* | 6/2021 | Choi | E05D 15/1047 |
| 2021/0172228 A1* | 6/2021 | Choi | E05D 15/48 |
| 2021/0172235 A1* | 6/2021 | Choi | E05F 15/619 |
| 2021/0172236 A1* | 6/2021 | Choi | E05F 15/619 |
| 2021/0172237 A1* | 6/2021 | Choi | E05F 15/655 |
| 2022/0090421 A1* | 3/2022 | Choi | B60J 5/047 |
| 2022/0090427 A1* | 3/2022 | Choi | E05B 83/38 |

* cited by examiner

VEHICLE DOOR OPENING AND CLOSING APPARATUS

CROSS-REFERENCE TO RELATED APPLICATION

This application claims the benefit of Korean Patent Application No. 10-2019-0160949, filed on Dec. 5, 2019, in the Korean Intellectual Property Office, which application is hereby incorporated herein by reference.

TECHNICAL FIELD

The present disclosure relates to a vehicle door opening and closing apparatus.

BACKGROUND

Vehicles have door apertures for ingress and egress of vehicle passengers into and out of a passenger compartment in the vehicle. A vehicle door is closed to block the door aperture and is opened to enable ingress and egress of passengers into and out of the passenger compartment through the door aperture. Vehicle doors are divided into swing doors and sliding doors. The swing door is opened and closed by swinging around a hinge mounted between the swing door and the vehicle body. The sliding door is opened and closed by sliding a roller mounted on the sliding door along a rail mounted on the vehicle body.

The swing door is very easy to open and close, thereby enabling quick ingress and egress of passengers. However, when the swing door is opened, a space for ingress and egress is relatively small. When the vehicle is located in a narrow space, a swing trajectory of the door is not secured, which makes the opening and closing operation thereof difficult.

The sliding door is very easy to open and close even when the vehicle is located in a narrow space. When the sliding door is opened, a space for ingress and egress is relatively large. However, the sliding door requires relatively more force and time to open and close, which hinders quick ingress and egress of passengers.

According to the related art, as a vehicle door is operated by a single opening and closing method, it may be difficult to adequately respond to the needs of customers seeking ease of use, diversity, and novelty.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

The present disclosure relates to a vehicle door opening and closing apparatus. Particular embodiments relate to a vehicle door opening and closing apparatus allowing a vehicle door to open and close in one mode selected from a swing mode and a sliding mode. Further embodiments relate to a vehicle door opening and closing apparatus in which an outside handle is allowed to operate in two motions to enable easy selection of a swing mode and a sliding mode.

An aspect of the present disclosure provides a vehicle door opening and closing apparatus allowing a vehicle door to open and close in one mode selected from a swing mode and a sliding mode, thereby satisfying the needs of customers. In particular, an outside handle is allowed to operate in different motions, thereby enabling easy selection of a swing mode and a sliding mode.

According to an aspect of the present disclosure, a vehicle door opening and closing apparatus may include a vehicle door having a main latch releasably engaging with a main striker mounted on a vehicle body, a rail mounted on the vehicle body, a roller unit mounted on the vehicle door, and allowing the vehicle door to open and close in one mode selected from a sliding mode, in which the vehicle door slides along the rail, and a swing mode, in which the vehicle door swings in a predetermined position of the rail, and an outside handle operatively connected to the main latch, and including a handle base mounted on the vehicle door and a handle grip movably mounted on the handle base. The handle grip may be slidable in a longitudinal direction of a vehicle, and be pivotal in a transverse direction of the vehicle. As the handle grip slides, the sliding mode may be selected, and as the handle grip pivots, the swing mode may be selected.

The handle grip may include a first grip body, a second grip body mounted on a first end portion of the first grip body, and a third grip body mounted on a second end portion of the first grip body. The first grip body may be slidable with respect to the handle base in the longitudinal direction of the vehicle, and be pivotal with respect to the handle base in the transverse direction of the vehicle.

The first grip body may be slidable with respect to the second grip body and the third grip body.

The second grip body and the third grip body may be pivotally mounted in the handle base.

The second grip body may have a pair of pivot projections, and the second grip body may be pivotally mounted in the handle base through the pair of pivot projections.

The first grip body may return to its original position by a return spring, and the return spring may be disposed between the first grip body and the second grip body.

The third grip body may have a first handle lever operatively connected to the main latch.

A main lever may be rotatably mounted on the handle base. The main lever may be connected to the main latch through a latch rod, and the first handle lever may be operatively connected to the main lever.

The first handle lever may extend from the third grip body toward the main latch, and an axis of the first handle lever may be orthogonal to an axis of the third grip body.

The outside handle may further include a second handle lever rotatably mounted on the handle base through a hinge pin. The second handle lever may transmit a force applied by the first grip body to the main lever when the first grip body slides.

The second handle lever may have a first extension portion operatively connected to the second end portion of the first grip body, and a second extension portion operatively connected to the main lever, the hinge pin may be located in a portion in which the first extension portion and the second extension portion are connected, and the second handle lever may rotate as the first grip body slides.

The first extension portion may have a contact projection contacting the second end portion of the first grip body.

An axis of the first extension portion may be orthogonal to an axis of the first grip body.

An axis of the second extension portion may be orthogonal to an axis of the first extension portion.

The roller unit may have a rotation axis and include a hold lock, and the roller unit may be releasably held in the predetermined position of the rail by the hold lock. The vehicle door may swing around the rotation axis when the roller unit is held in the predetermined position of the rail by the hold lock, and the vehicle door may slide along the rail when the roller unit is released by the hold lock.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLLUSTRATIVE EMBODIMENTS

Figure 1:
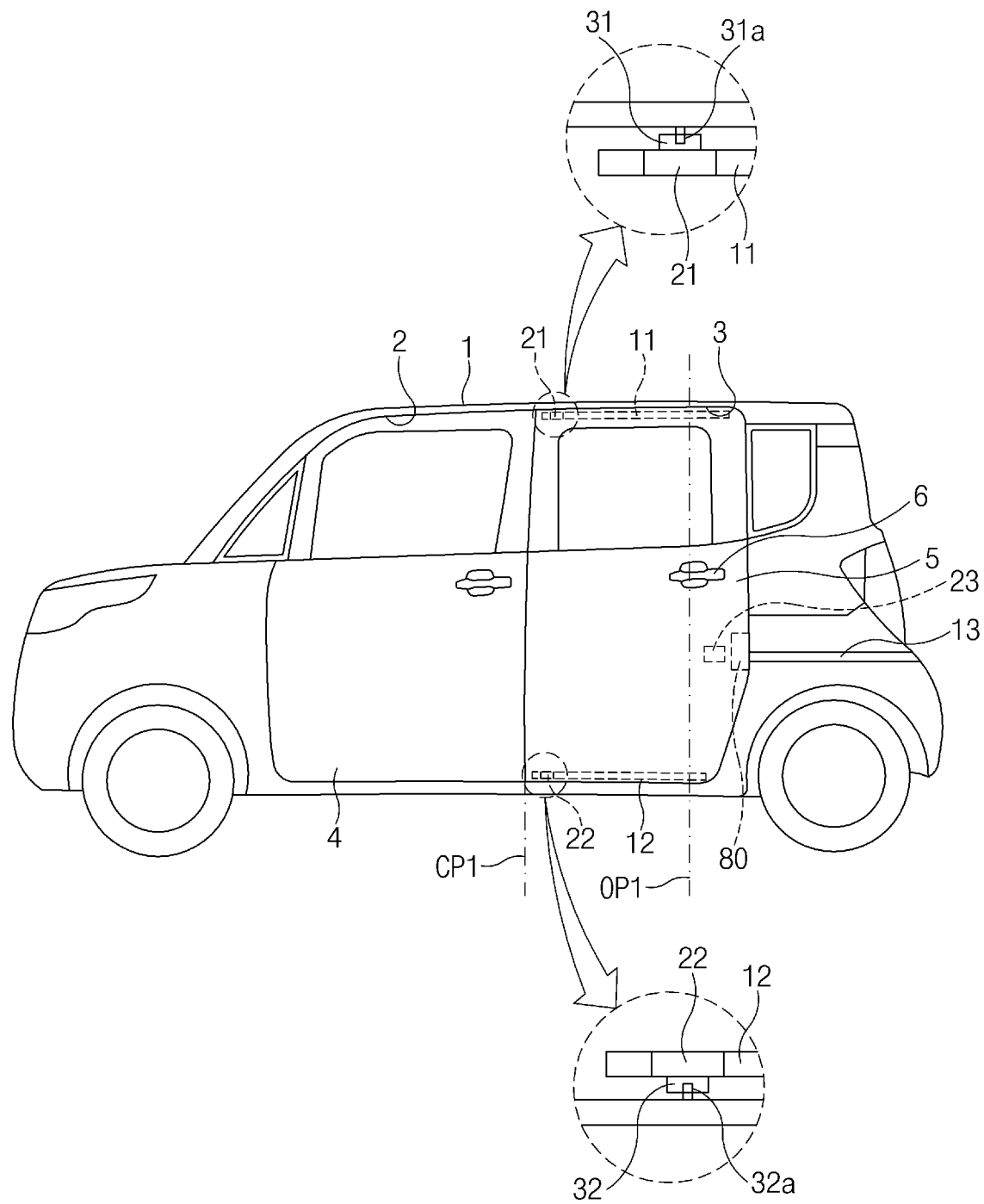
FIG. 1 illustrates a vehicle door opening and closing apparatus according to an exemplary embodiment of the present disclosure, which is mounted on a rear door of a vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A vehicle door opening and closing apparatus, according to exemplary embodiments of the present disclosure, may allow a vehicle door to open and close selectively in any one mode of a sliding mode and a swing mode. In other words, the vehicle door opening and closing apparatus, according to exemplary embodiments of the present disclosure, may be a transform-type door opening and closing apparatus. The sliding mode may allow the vehicle door to open and close by sliding in a longitudinal direction of a vehicle, and the swing mode may allow the vehicle door to open and close by swinging inwards and outwards.

Referring to FIG. 1, a vehicle body 1 may have a plurality of door apertures 2 and 3, and the plurality of door apertures 2 and 3 may be divided into a front aperture 2 and a rear aperture 3. A plurality of vehicle doors 4 and 5 may include a front door 4 covering and uncovering the front aperture 2, and a rear door 5 covering and uncovering the rear aperture 3. As the front door 4 is opened, the front door 4 may uncover the front aperture 2, and as the front door 4 is closed, the front door 4 may cover the front aperture 2. As the rear door 5 is opened, the rear door 5 may uncover the rear aperture 3, and as the rear door 5 is closed, the rear door 5 may cover the rear aperture 3.

The vehicle door opening and closing apparatus, according to exemplary embodiments of the present disclosure, may be applied to the front door 4, the rear door 5, and the like. FIGS. 1 to 16 illustrate a vehicle door opening and closing apparatus according to exemplary embodiments of the present disclosure, which is applied to the rear door 5. Hereinafter, the rear door 5 will be referred to as the vehicle door 5, and the rear aperture 3 will be referred to as the door aperture 3.

The vehicle door opening and closing apparatus, according to exemplary embodiments of the present disclosure, may include one or more rails 11 and 12 mounted on the vehicle body 1, and the rails 11 and 12 may extend in the longitudinal direction of the vehicle. Referring to FIG. 1, an upper rail 11 may be mounted on an upper edge of the vehicle body 1, and a lower rail 12 may be mounted on a lower edge of the vehicle body 1. The upper rail 11 and the lower rail 12 may extend in the longitudinal direction of the vehicle. The upper rail 11 may be disposed on an upper edge of the door aperture 3, and the lower rail 12 may be disposed on a lower edge of the door aperture 3.

The vehicle door opening and closing apparatus, according to exemplary embodiments of the present disclosure, may include roller units 21 and 22 guided along the rails 11 and 12. The roller units 21 and 22 may allow the vehicle door 5 to open and close in one mode selected from the sliding mode and the swing mode. In particular, the roller units 21 and 22 may be releasably held in predetermined positions of the rails 11 and 12 by hold locks 31 and 32. Specifically, when the roller units 21 and 22 are held in the predetermined positions of the rails 11 and 12 by the hold locks 31 and 32, the vehicle door 5 may be opened and closed in the swing mode in which the vehicle door swings in the predetermined positions of the rails 11 and 12. When the roller units 21 and 22 are released by the hold locks 31 and 32, the vehicle door 5 may be opened and closed in the sliding mode in which the vehicle door slides along the rails 11 and 12.

Figure 3:
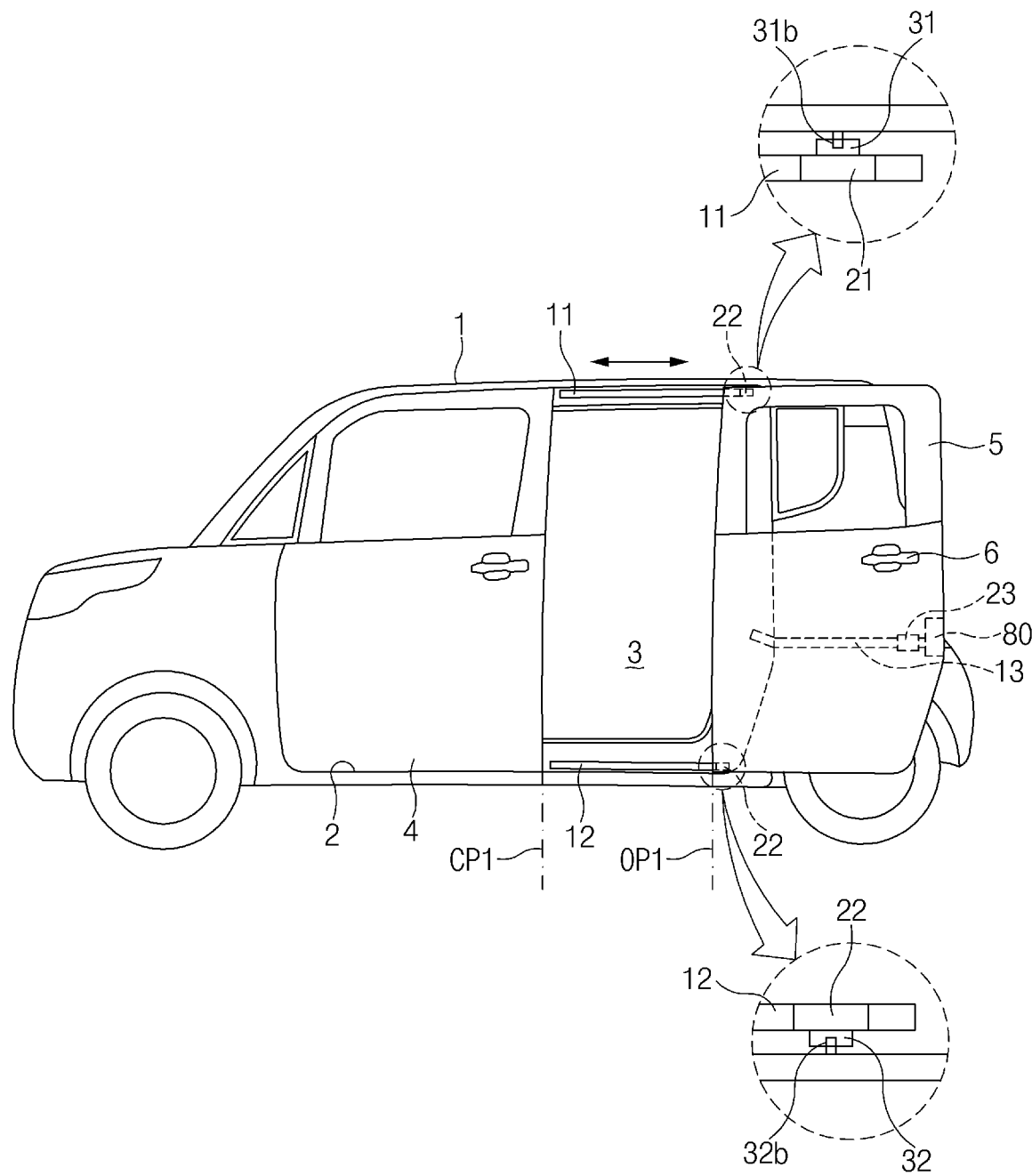
FIG. 3 illustrates a state in which the door of FIG. 1 is opened in a sliding mode.

Referring to FIGS. 1 and 3, an upper roller unit 21 may be mounted on an upper end of the vehicle door 5, and the upper roller unit 21 may slide along the upper rail 11. A lower roller unit 22 may be mounted on a lower end of the vehicle door 5, and the lower roller unit 22 may slide along the lower rail 12.

Figure 2:
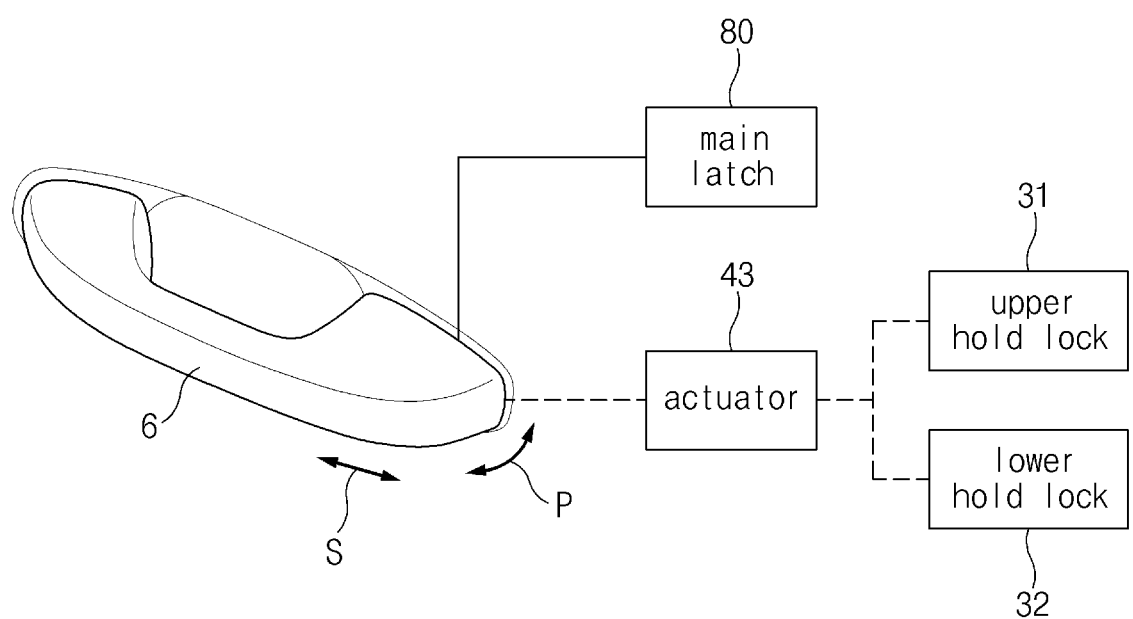
FIG. 2 illustrates a main latch, an actuator connected to an outside handle of a vehicle, and hold locks.
Figure 17:
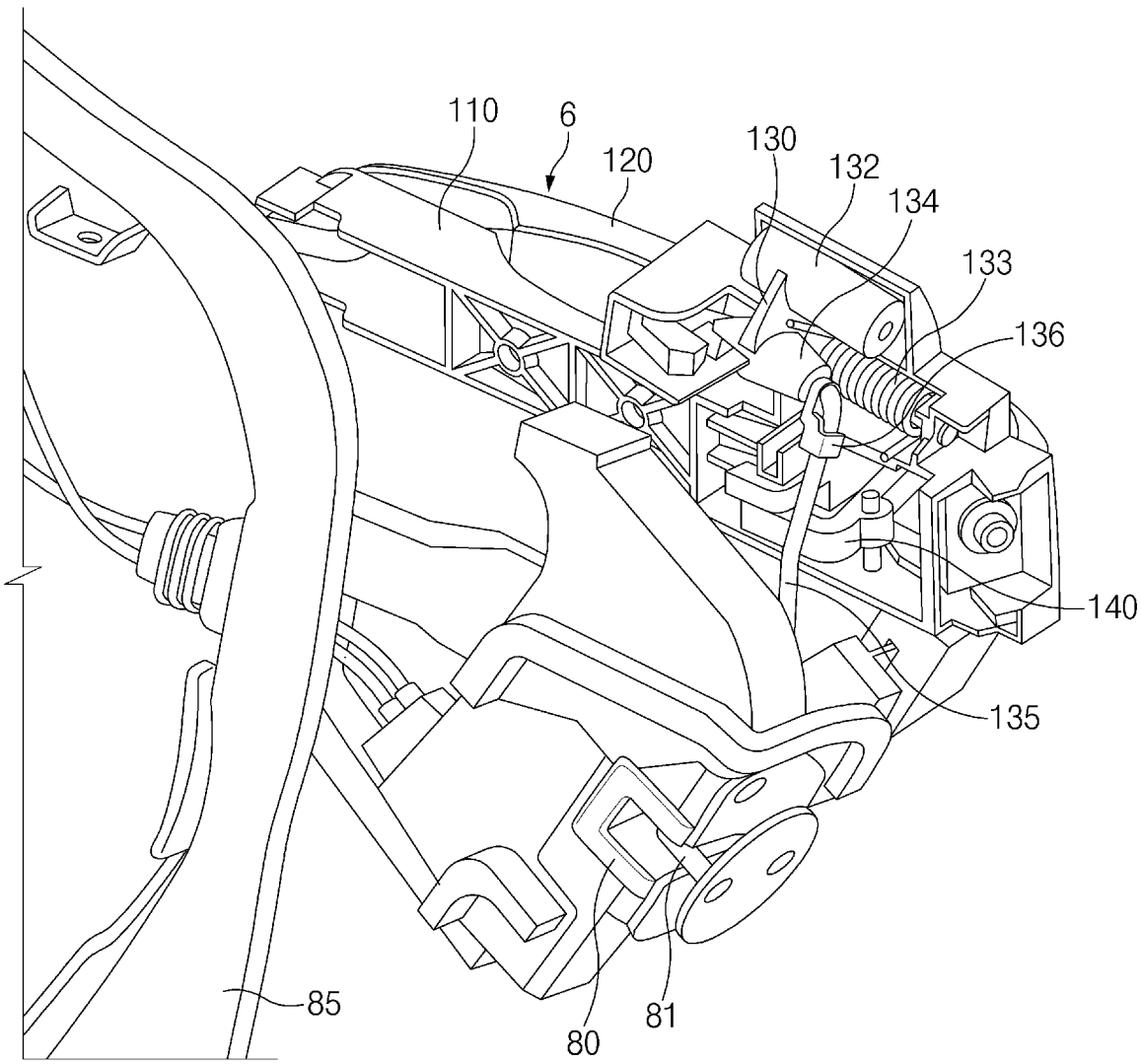
FIG. 17 illustrates a perspective view of an outside handle and a main latch in a vehicle door opening and closing apparatus according to an exemplary embodiment of the present disclosure.

Referring to FIG. 2, the vehicle door 5 may include an outside handle 6, and the outside handle 6 may operate in different directions. Referring to FIG. 17, the outside handle 6 may include a handle base 110 mounted on the vehicle door 5, and a handle grip 120 movable with respect to the handle base 110. The handle grip 120 of the outside handle 6 may be slidably moved in the longitudinal direction of the vehicle (see direction S in FIG. 2), and be pivotally moved in a transverse direction of the vehicle (see direction P in FIG. 2). The outside handle 6 may be operatively connected to a main latch 80. As the handle grip 120 of the outside handle 6 slides in the longitudinal direction of the vehicle or pivots in the transverse direction of the vehicle in a state in which the vehicle door 5 is closed, the main latch 80 may release a main striker 81 such that the main latch 80 may be unlocked.

When a user pushes the handle grip 120 of the outside handle 6 toward the front of the vehicle or pushes the handle grip 120 of the outside handle 6 toward the rear of the vehicle, the handle grip 120 of the outside handle 6 may slide in the longitudinal direction of the vehicle (see direction S in FIG. 2), and thus the sliding mode may be selected. In the sliding mode, the vehicle door 5 may slide along the upper rail 11, the lower rail 12, and a center rail 13 as illustrated in FIG. 3. In the sliding mode, the vehicle door 5 may move between a first open position OP1 and a first closed position CP1, as illustrated in FIGS. 1 and 3. The first open position OP1 refers to a position in which the vehicle door 5 is fully opened, and the first closed position CP1 refers to a position in which the vehicle door 5 is fully closed.

Figure 4:
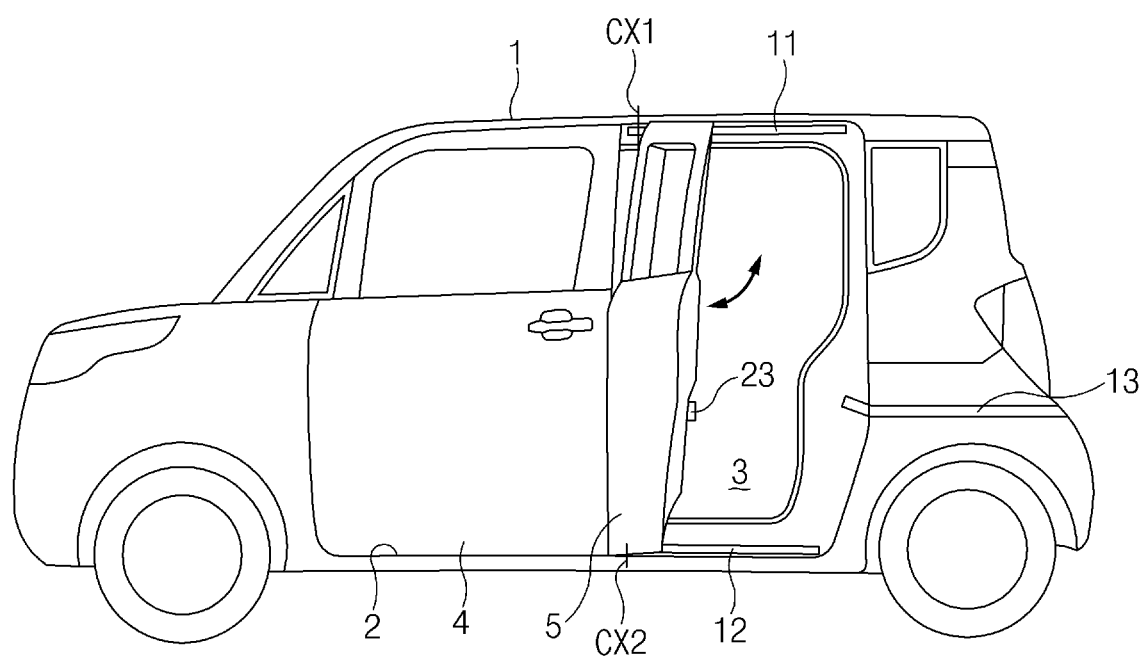
FIG. 4 illustrates a state in which the door of FIG. 1 is opened in a swing mode.
Figure 7:
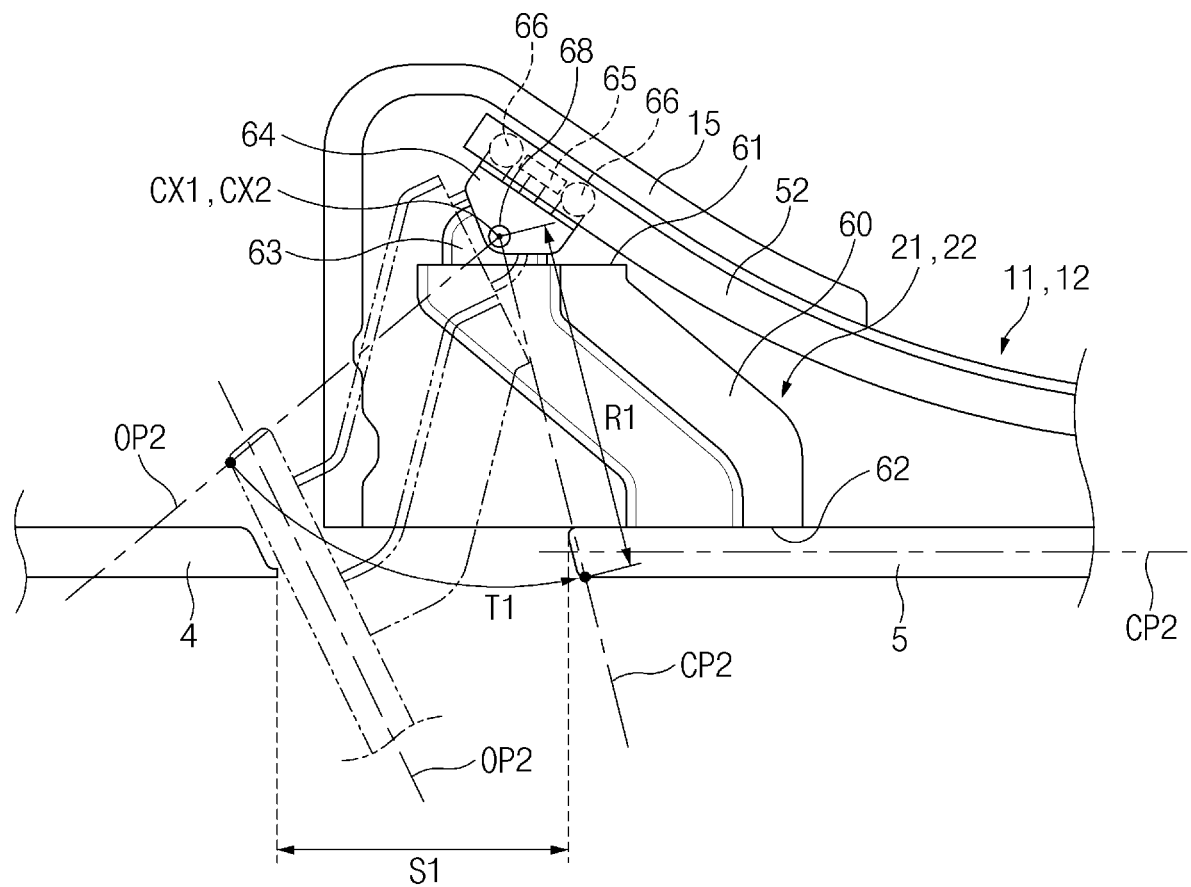
FIG. 7 illustrates an operation in which a vehicle door is opened and closed in a swing mode by an upper roller unit and a lower roller unit of a vehicle door opening and closing apparatus according to an exemplary embodiment of the present disclosure.
Figure 9:
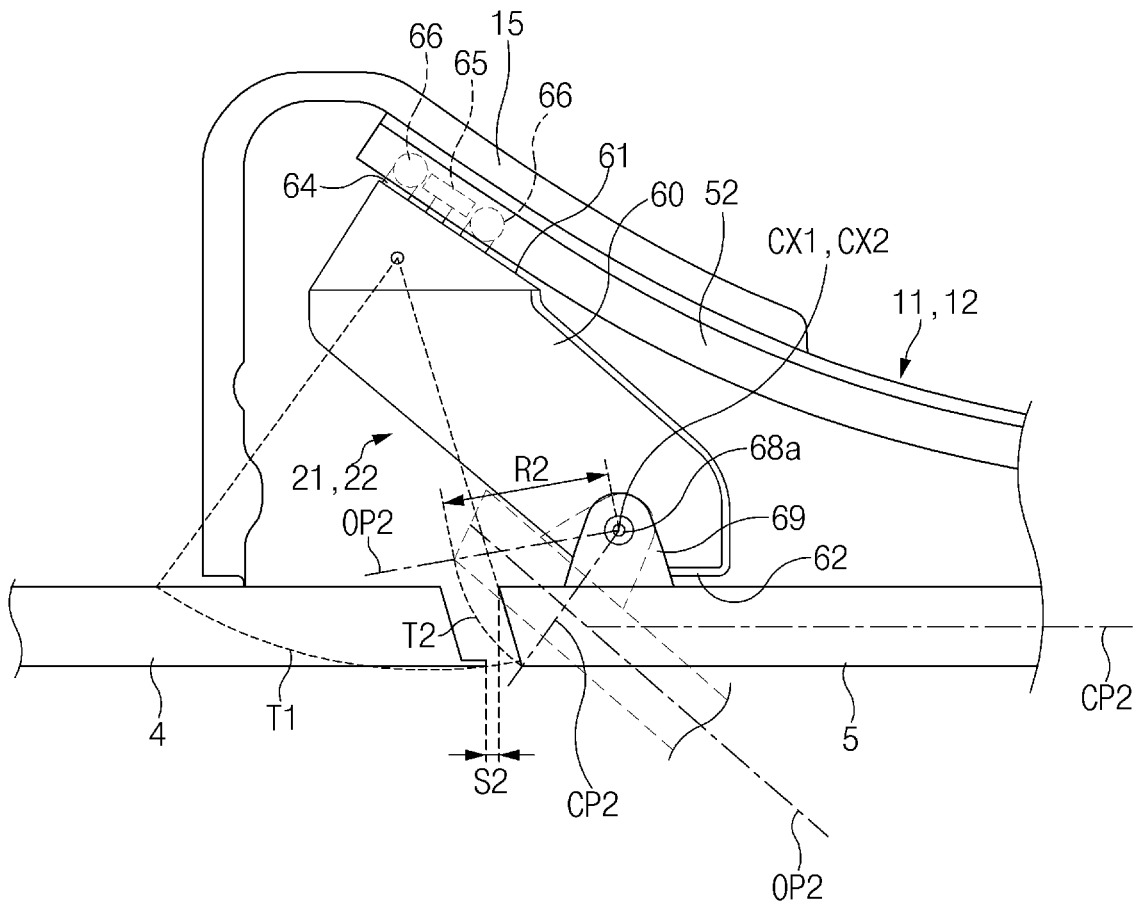
FIG. 9 illustrates an operation in which a vehicle door is opened and closed in a swing mode by an upper roller unit and a lower roller unit of a vehicle door opening and closing apparatus according to another exemplary embodiment of the present disclosure.

When the user pulls the handle grip 120 of the outside handle 6 toward the exterior side of the vehicle or pushes the handle grip 120 of the outside handle 6 toward a passenger compartment of the vehicle, the handle grip 120 of the outside handle 6 may pivot in the transverse direction of the vehicle (see direction P in FIG. 2), and thus the swing mode may be selected. In the swing mode, the vehicle door 5 may swing as illustrated in FIG. 4. In the swing mode, the vehicle door 5 may move between a second open position OP2 in which the vehicle door 5 is fully opened and a second closed position CP2 in which the vehicle door 5 is fully closed, as illustrated in FIGS. 7 and 9. In particular, when the vehicle door 5 is held in the first closed position CP1, it may be operated in the swing mode.

The upper roller unit 21 may have an upper hold lock 31, and the vehicle body 1 may have a first upper striker 31a and a second upper striker 31b protruding downwardly from a roof of the vehicle body 1. The first upper striker 31a may be aligned with or adjacent to a virtual axis of the first closed position CP1, and the second upper striker 31b may be aligned with or adjacent to a virtual axis of the first open position OP1.

According to an exemplary embodiment, as illustrated in FIGS. 1 and 3, the upper hold lock 31 may releasably hold the first upper striker 31a in the first closed position CP1, and releasably hold the second upper striker 31b in the first open position OP1. That is, one upper hold lock 31 may selectively hold the first upper striker 31a and the second upper striker 31b. As the upper hold lock 31 holds the first upper striker 31a, the upper roller unit 21 may be firmly held in the first closed position CP1, so that the vehicle door 5 may be kept in the first closed position CP1. As the upper hold lock 31 holds the second upper striker 31b, the upper roller unit 21 may be firmly held in the first open position OP1, so that the vehicle door 5 may be kept in the first open position OP1.

According to another exemplary embodiment, the upper hold lock 31 may releasably hold the first upper striker 31a in the first closed position CP1 so that the vehicle door 5 may be kept in the first closed position CP1. That is, the upper hold lock 31 may be an upper closed hold lock which keeps the closed state of the vehicle door 5 in the first closed position CP1. An upper open hold lock (not shown) may be mounted on the upper roller unit 21, and may releasably hold the second upper striker 31b in the first open position OP1. That is, the upper closed hold lock, which releasably holds the first upper striker 31a in the first closed position CP1, and the upper open hold lock, which releasably holds the second upper striker 31b in the first open position OP1, may be individually mounted on the upper roller unit 21.

Referring to FIGS. 4 and 9, the upper roller unit 21 may have an upper rotation axis CX1, and the vehicle door 5 may rotate around the upper rotation axis CX1. When the upper roller unit 21 is firmly held in the first closed position CP1 by the upper hold lock 31 and the first upper striker 31a, the vehicle door 5 may rotate around the upper rotation axis CX1.

The lower roller unit 22 may have a lower hold lock 32, and the vehicle body 1 may have a first lower striker 32a and a second lower striker 32b protruding upwardly from the bottom of the vehicle body 1. The first lower striker 32a may be aligned with or adjacent to the virtual axis of the first closed position CP1, and the second lower striker 32b may be aligned with or adjacent to the virtual axis of the first open position OP1.

According to an exemplary embodiment, as illustrated in FIGS. 1 and 3, the lower hold lock 32 may releasably hold the first lower striker 32a in the first closed position CP1, and releasably hold the second lower striker 32b in the first open position OP1. That is, one lower hold lock 32 may selectively hold the first lower striker 32a and the second lower striker 32b. As the lower hold lock 32 holds the first lower striker 32a, the lower roller unit 22 may be firmly held in the first closed position CP1, so that the vehicle door 5 may be kept in the first closed position CP1. As the lower hold lock 32 holds the second lower striker 32b, the lower roller unit 22 may be firmly held in the first open position OP1, so that the vehicle door 5 may be kept in the first open position OP1.

According to another exemplary embodiment, the lower hold lock 32 may releasably hold the first lower striker 32a in the first closed position CP1 so that the vehicle door 5 may be kept in the first closed position CP1. That is, the lower hold lock 32 may be a lower closed hold lock which keeps the closed state of the vehicle door 5 in the first closed position CP1. A lower open hold lock (not shown) may be mounted on the lower roller unit 22, and may releasably hold the second lower striker 32b in the first open position OP1. That is, the lower closed hold lock, which releasably holds the first lower striker 32a in the first closed position CP1, and the lower open hold lock, which releasably holds the second lower striker 32b in the first open position OP1, may be individually mounted on the lower roller unit 22.

According to an exemplary embodiment, the vehicle door 5 may be releasably held in the first closed position CP1 by the upper hold lock 31 and the lower hold lock 32, so that the vehicle door 5 may be kept in the first closed position CP1 by the upper hold lock 31 and the lower hold lock 32. That is, the upper hold lock 31 and the lower hold lock 32 may function as the closed hold lock which holds the vehicle door 5 in the first closed position CP1.

Referring to FIGS. 4 and 9, the lower roller unit 22 may have a lower rotation axis CX2, and the vehicle door 5 may rotate around the lower rotation axis CX2. When the lower roller unit 22 is firmly held in the first closed position CP1 by the lower hold lock 32 and the first lower striker 32a, the vehicle door 5 may rotate around the lower rotation axis CX2.

As illustrated in FIG. 4, the upper rotation axis CX1 and the lower rotation axis CX2 may be vertically aligned, and the vehicle door 5 may rotate around the vertically aligned upper and lower rotation axes CX1 and CX2.

Referring to FIG. 2, the outside handle 6 may be electrically or mechanically connected to an actuator 43, and the actuator 43 may be configured to operate the upper hold lock 31 and the lower hold lock 32. When the user operates the handle grip 120 of the outside handle 6 to slide in the longitudinal direction of the vehicle or to swing in the transverse direction of the vehicle, the actuator 43 may selectively perform a hold operation in which the upper hold lock 31 holds the first upper striker 31a and the lower hold lock 32 holds the first lower striker 32a, and a release operation in which the upper hold lock 31 releases the first upper striker 31a and the lower hold lock 32 releases the first lower striker 32a.

When the user pushes the outside handle 6 toward the rear of the vehicle in a state in which the vehicle door 5 is closed, the main latch 80 may release the main striker 81, and the upper and lower hold locks 31 and 32 may release the first upper and lower strikers 31a and 32a by the release operation of the actuator 43 simultaneously. Thus, the vehicle door 5 may be opened and closed in the sliding mode.

When the user pulls the outside handle 6 toward the exterior side of the vehicle in a state in which the vehicle door 5 is closed, the main latch 80 may release the main striker 81, and the upper and lower hold locks 31 and 32 may hold the first upper and lower strikers 31a and 32a by the hold operation of the actuator 43 simultaneously, and accordingly the upper roller unit 21 and the lower roller unit 22 may be firmly held in the first closed position CP1. Thus, the vehicle door 5 may be opened in the swing mode.

According to an exemplary embodiment, as illustrated in FIG. 2, one actuator 43 may operate the upper hold lock 31 and the lower hold lock 32 simultaneously.

According to another exemplary embodiment, an actuator operating the upper hold lock 31 and another actuator operating the lower hold lock 32 may be individually connected to the outside handle 6.

FIGS. 10A to 10D illustrate the upper hold lock 31 and the lower hold lock 32 according to an exemplary embodiment of the present disclosure. Referring to FIGS. 10A to 10D, each of the upper hold lock 31 and the lower hold lock 32 may include a catch 71, a pawl 72 releasably engaging with the catch 71, and a lever 73 operatively connected to the pawl 72. The lever 73 may be connected to the actuator 43 through a cable 75. As the cable 75 is reversed (pulled) by the actuator 43, the catch 71 may release the strikers 31a and 32a. A portion of the catch 71, the pawl 72, and the lever 73 may be covered by a cover plate 76, and the cover plate 76 may be attached to a mounting plate 74. The strikers 31a and 32a may be fixed to the vehicle body 1 by a mounting plate 78.

Referring to FIGS. 10A to 10D, the upper hold lock 31 may releasably hold the first upper striker 31a, and the lower hold lock 32 may releasably hold the first lower striker 32a.

Figure 10A:
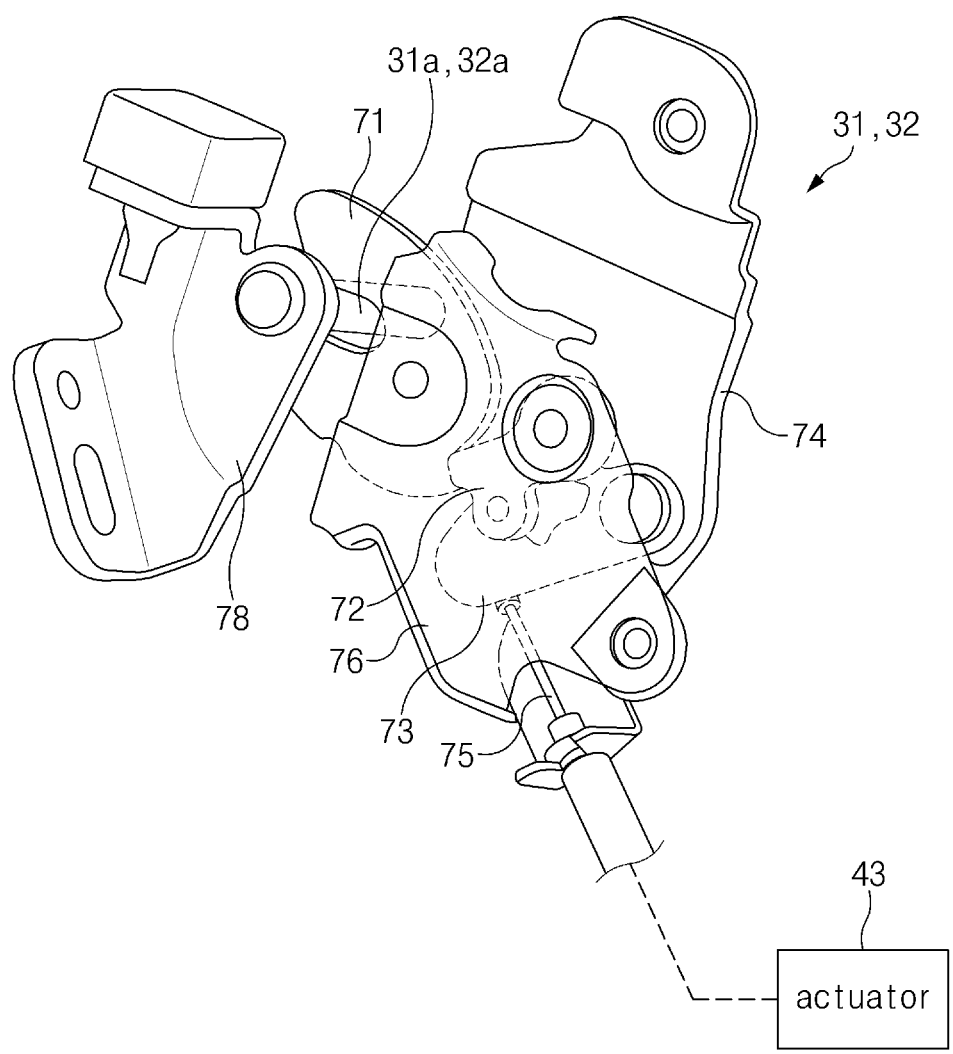
FIG. 10A illustrates a perspective view of an upper hold lock and a lower hold lock.
Figure 10B:
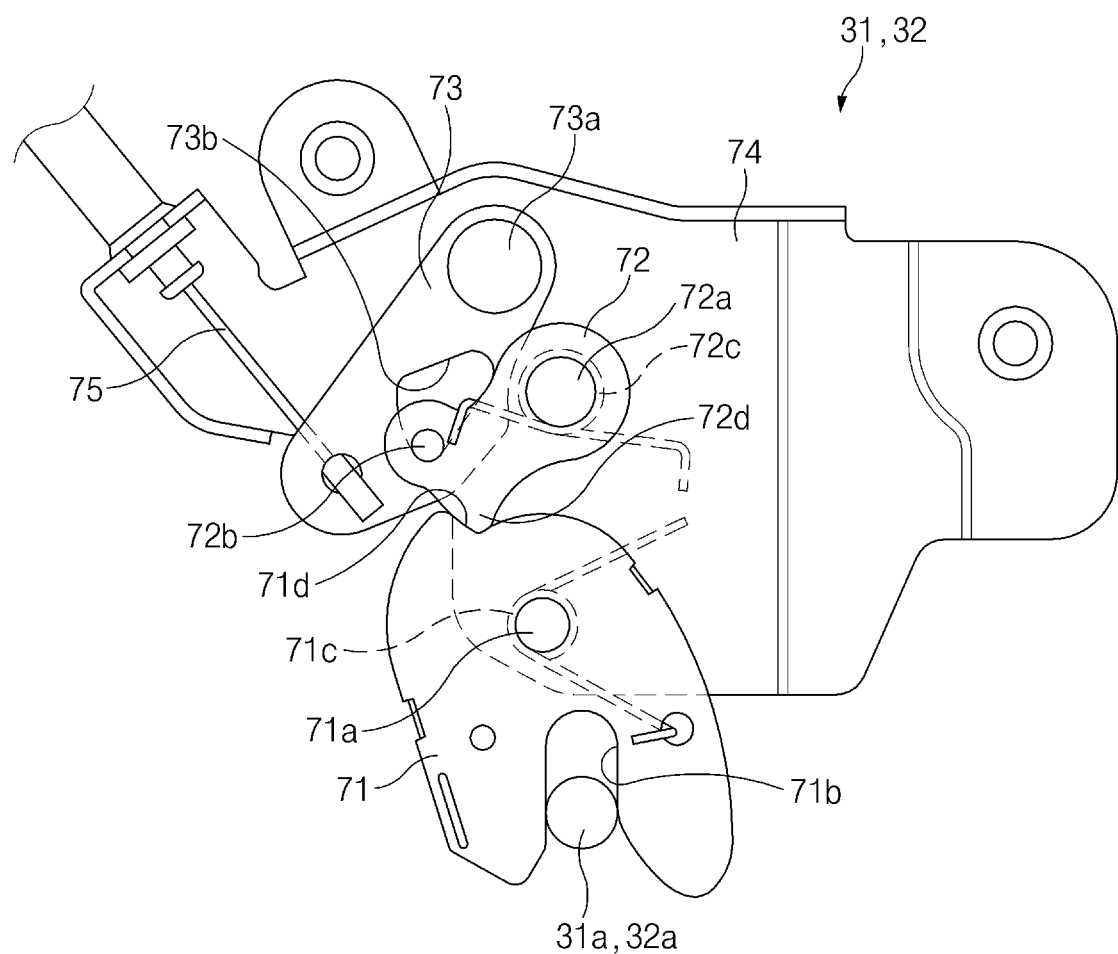
FIG. 10B illustrates a state in which an upper hold lock and a lower hold lock hold corresponding strikers.
Figure 10C:
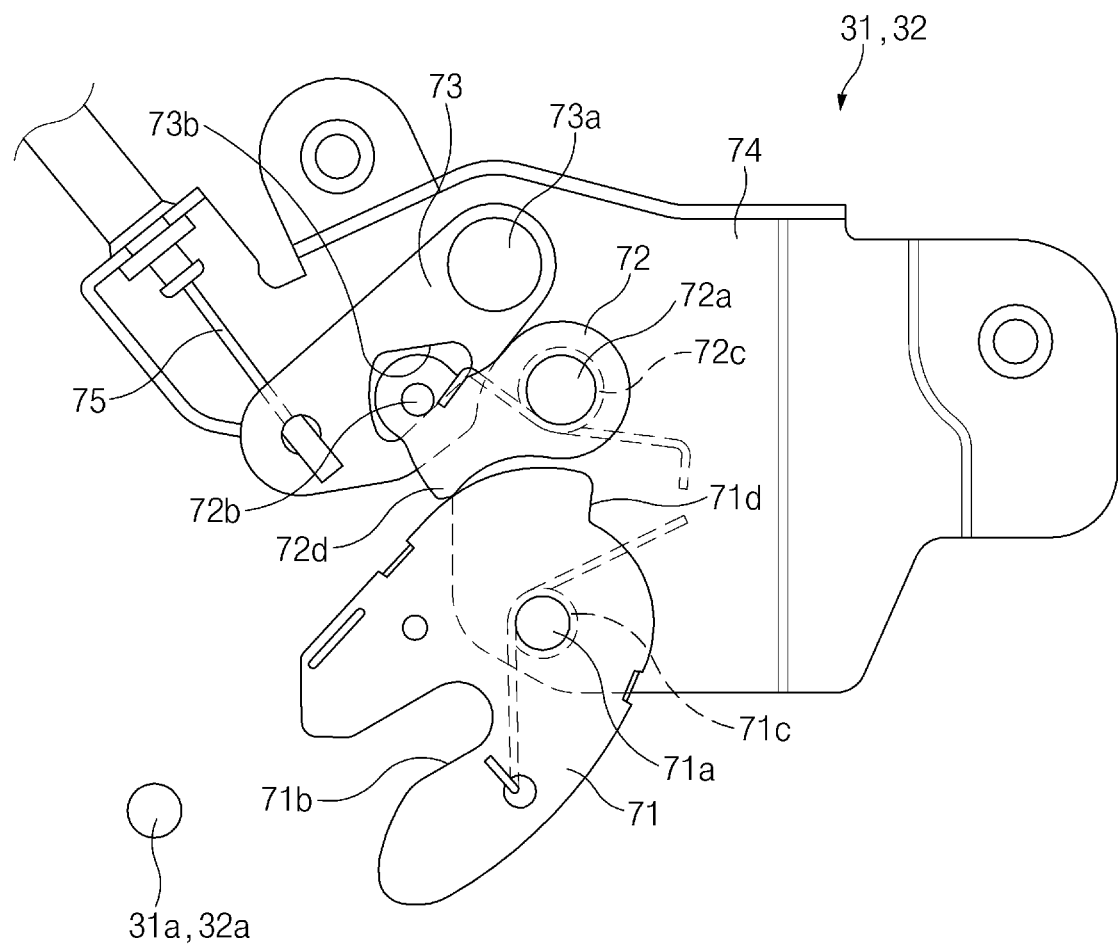
FIG. 10C illustrates a state in which an upper hold lock and a lower hold lock release corresponding strikers.

The catch 71 may be pivotally mounted on the mounting plate 74 through a first pivot shaft 71a. The catch 71 may have a slot 71b receiving the strikers 31a and 32a, and the catch 71 may engage with or release the strikers 31a and 32a. The catch 71 may move between an engaging position (see FIG. 10B) and a release position (see FIG. 10C). The engaging position refers to a position in which the catch 71 engages with the strikers 31a and 32a as illustrated in FIG. 10B, and the release position refers to a position in which the catch 71 releases the strikers 31a and 32a as illustrated in FIG. 10C. When the catch 71 is in the engaging position as illustrated in FIG. 10B, the catch 71 may engage with the strikers 31a and 32a so that the catch 71 may hold the strikers 31a and 32a. When the catch 71 is in the release position as illustrated in FIG. 10C, the catch 71 may release the strikers 31a and 32a. Thus, the strikers 31a and 32a may be released from the slot 71b of the catch 71 or be received in the slot 71b of the catch 71. The catch 71 may be biased toward the release position by a first biasing element 71c such as a torsion spring. The first biasing element 71c may be disposed around the first pivot shaft 71a. The catch 71 may have a locking shoulder 71d.

Figure 10D:
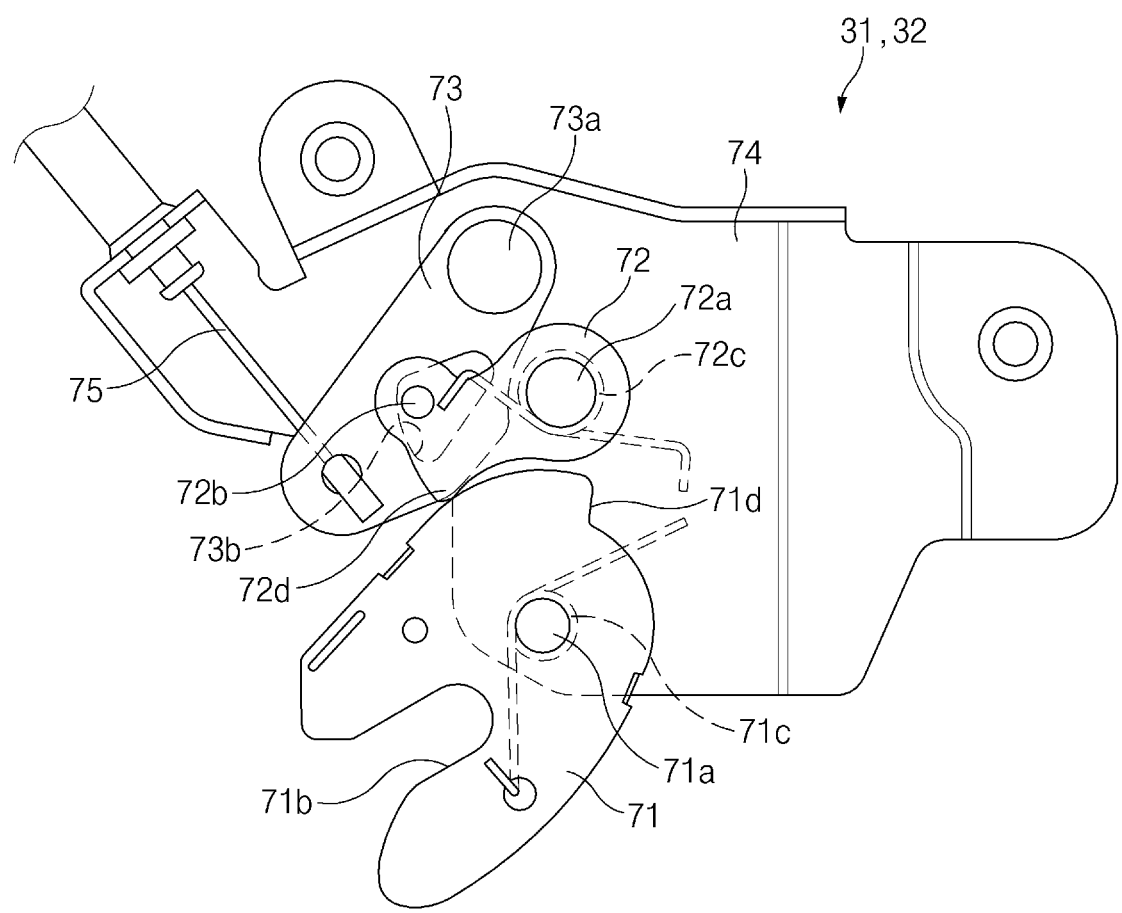
FIG. 10D illustrates a state in which an upper hold lock and a lower hold lock are enabled to receive corresponding strikers.

The pawl 72 may be pivotally mounted on the mounting plate 74 through a second pivot shaft 72a, and the pawl 72 may move between a pawl locking position (see FIG. 10B) and a pawl release position (see FIGS. 10C and 10D). The pawl locking position refers to a position in which the pawl 72 engages with the catch 71 and the catch 71 is kept in the engaging position, and the pawl release position refers to a position in which the pawl 72 releases the catch 71 and the catch 71 is allowed to move from the engaging position to the release position. As illustrated in FIG. 10B, when the pawl 72 is in the pawl locking position, the movement (rotation) of the catch 71 may be restricted by the pawl 72 so that the catch 71 may be kept in the engaging position. As illustrated in FIGS. 10C and 10D, when the pawl 72 is in the pawl release position, the movement (rotation) of the catch 71 may not be restricted by the pawl 72 so that the catch 71 may move from the engaging position to the release position. The pawl 72 may be biased toward the pawl locking position (see FIG. 10B) by a second biasing element 72c such as a torsion spring. The second biasing element 72c may be disposed around the second pivot shaft 72a.

The pawl 72 may have a locking projection 72d locked to the locking shoulder 71d of the catch 71. As illustrated in FIG. 10B, as the pawl 72 is moved to the pawl locking position by the second biasing element 72c, the locking projection 72d of the pawl 72 may be locked to the locking shoulder 71d of the catch 71 and the movement (rotation) of the catch 71 may be restricted, so that the catch 71 may be kept in the engaging position. As illustrated in FIG. 10C, as the pawl 72 is moved to the pawl release position by the lever 73, the locking projection 72d of the pawl 72 may be released from the locking shoulder 71d of the catch 71 and the movement (rotation) of the catch 71 may be allowed, so that the catch 71 may be moved to the release position by the first biasing element 71c.

The lever 73 may be pivotally mounted on the mounting plate 74 through a third pivot shaft 73a. The lever 73 may be connected to the actuator 43 through the cable 75. An end of the cable 75 may be fixed to the lever 73, and the cable 75 may be advanced or reversed by the actuator 43. As the actuator 43 moves the cable 75, the lever 73 may pivot around the third pivot shaft 73a. The lever 73 may move the pawl 72 to the pawl release position (see FIG. 10C) by reversing the cable 75.

The lever 73 may be operatively connected to the pawl 72 through a pin 72b and an opening 73b. The pin 72b may be provided on the pawl 72, and the opening 73b may be provided in the lever 73. The pin 72b may be movably received in the opening 73b. As the lever 73 pivots around the third pivot shaft 73a, the pin 72b may move in the opening 73b, allowing the pawl 72 to move.

As illustrated in FIG. 10B, when the cable 75 is advanced by the actuator 43, the locking projection 72d of the pawl 72 may be locked to the locking shoulder 71d of the catch 71 and the movement (rotation) of the catch 71 may be restricted so that the catch 71 may be kept in the engaging position. The strikers 31a and 32a may be held in the slot 71b of the catch 71. That is, the upper hold lock 31 and the lower hold lock 32 may hold the corresponding strikers 31a and 32a.

As illustrated in FIG. 10C, when the cable 75 is reversed by the actuator 43, the lever 73 may move the pawl 72 to the pawl release position. The locking projection 72d of the pawl 72 may be released from the locking shoulder 71d of the catch 71 and the movement (rotation) of the catch 71 may be allowed, so that the catch 71 may be moved to the release position by the first biasing element 71c, and the strikers 31a and 32a may be released from the slot 71b of the catch 71. Thus, the upper hold lock 31 and the lower hold lock 32 may release the corresponding strikers 31a and 32a, and the upper roller unit 21 and the lower roller unit 22 may slide along the upper rail 11 and the lower rail 12.

As illustrated in FIG. 10D, even though the cable 75 is advanced by the actuator 43 in a state in which the locking projection 72d of the pawl 72 is released from the locking shoulder 71d of the catch 71, the catch 71 may be kept in the release position by the first biasing element 71c so that the movement (rotation) of the catch 71 may be allowed. In this state, the strikers 31a and 32a may be allowed to be received in the slot 71b of the catch 71. That is, in a state in which the movement (rotation) of the catch 71 is allowed as the locking projection 72d of the pawl 72 is released from the locking shoulder 71d of the catch 71, when the upper roller unit 21 and the lower roller unit 22 slide between the first closed position CP1 and the first open position OP1, the strikers 31a and 32a may be allowed to be received in the slot 71b of the catch 71. When a force applied by the upper hold lock 31 and the lower hold lock 32 in a state in which the strikers 31a and 32a are received in the slot 71b of the catch 71 is greater than a spring force of the first biasing element 71c, the catch 71 may be moved to the engaging position. As illustrated in FIG. 10B, as the locking projection 72d of the pawl 72 is locked to the locking shoulder 71d of the catch 71, the catch 71 may hold the strikers 31a and 32a.

Figure 5:
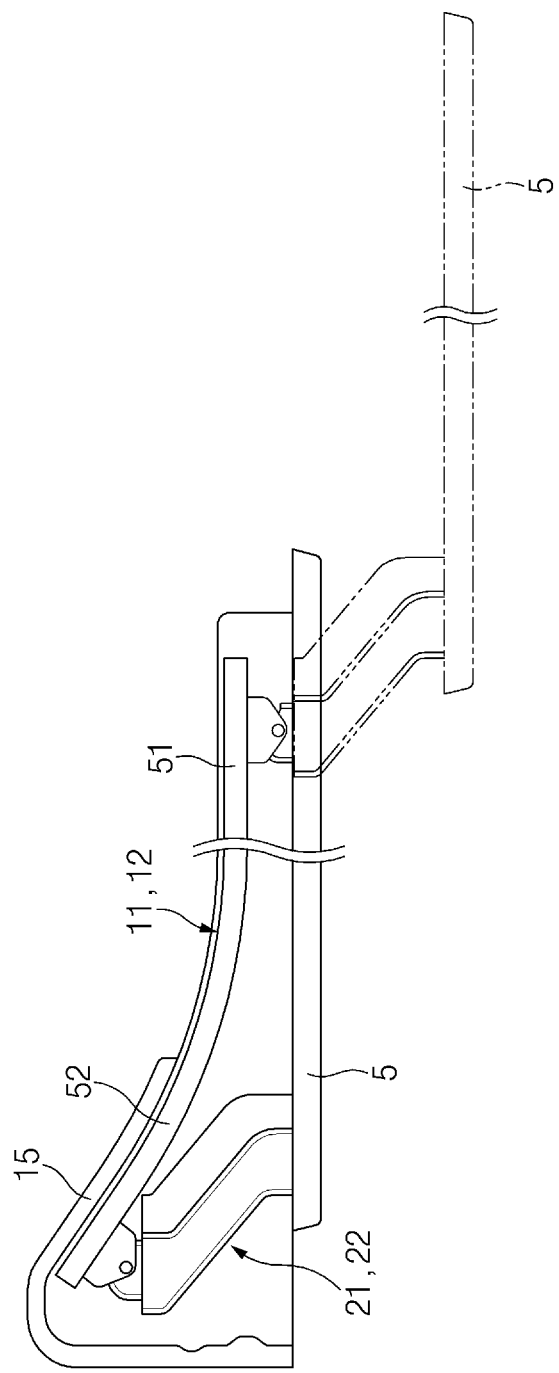
FIG. 5 illustrates an operation in which an upper roller unit and a lower roller unit move along an upper rail and a lower rail in a vehicle door opening and closing apparatus according to an exemplary embodiment of the present disclosure.

Referring to FIG. 5, each of the upper rail 11 and the lower rail 12 may be mounted on the vehicle body 1 through a mounting bracket 15, and the mounting bracket 15 may have a shape corresponding to that of the upper rail 11 and the lower rail 12. Each of the upper rail 11 and the lower rail 12 may have a first extension portion 51 extending straightly in the longitudinal direction of the vehicle, and a second extension portion 52 extending from the first extension portion 51 toward the interior space of the vehicle. The second extension portion 52 may be bent with respect to the first extension portion 51 at a predetermined angle.

Figure 6:
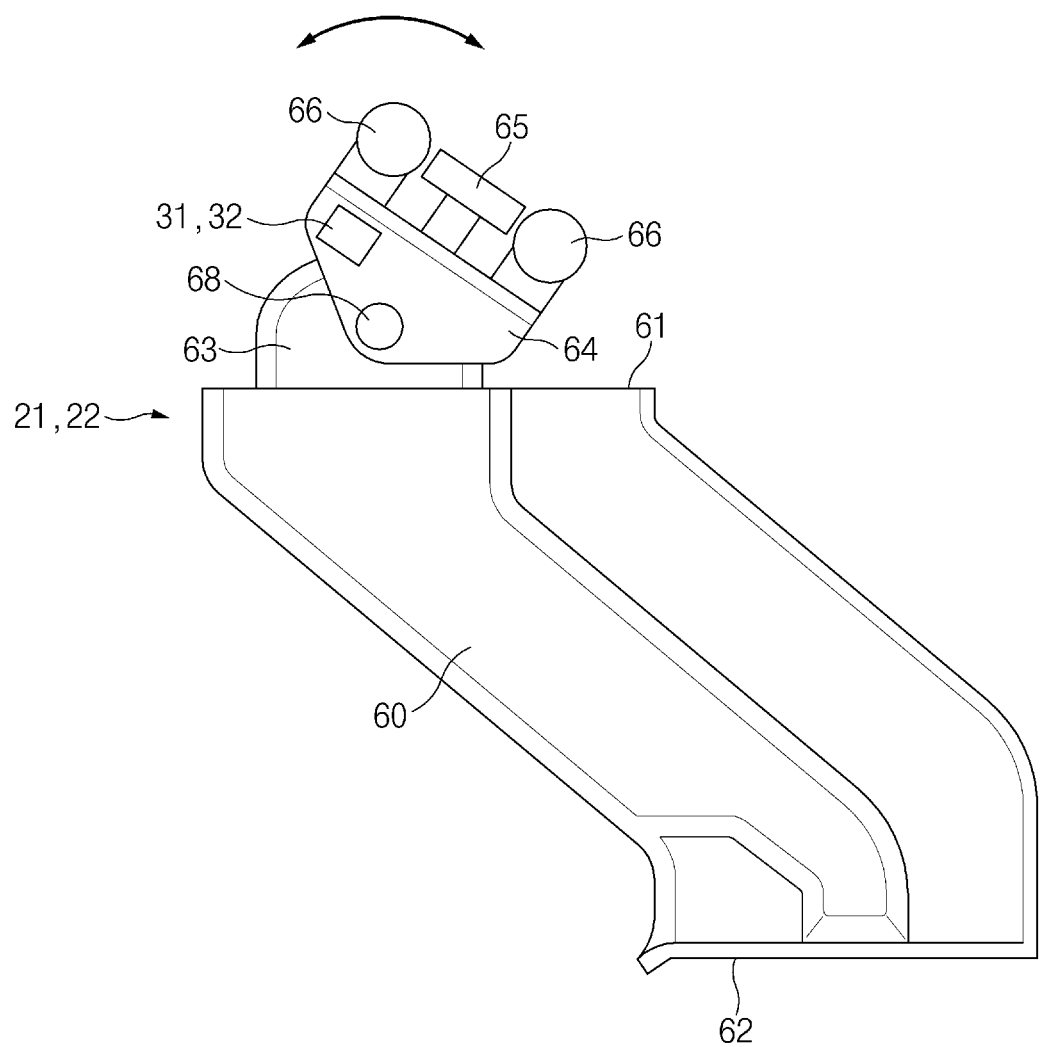
FIG. 6 illustrates an upper roller unit and a lower roller unit in a vehicle door opening and closing apparatus according to an exemplary embodiment of the present disclosure.

Referring to FIG. 6, each of the upper roller unit 21 and the lower roller unit 22 may include a roller bracket 64 having rollers 65 and 66 rolling along the rails 11 and 12, and a body 60 connecting the roller bracket 64 and the vehicle door 5.

The body 60 may extend diagonally so as not to contact the first extension portion 51 and the second extension portion 52. The body 60 may have a first end portion 61 facing the interior side of the vehicle, and a second end portion 62 facing the exterior side of the vehicle. The first end portion 61 of the body 60 may be attached to the roller bracket 64, and the second end portion 62 of the body 60 may be attached to the vehicle door 5.

The roller bracket 64 may rotatably support the rollers 65 and 66, and the rollers 65 and 66 may roll along the upper rail 11 and the lower rail 12. As illustrated in FIG. 6, a middle roller 65 and two side rollers 66 disposed on both sides of the middle roller 65 may be rotatably mounted on the roller bracket 64. A rotation axis of the middle roller 65 may be orthogonal to a rotation axis of the side roller 66.

According to an exemplary embodiment, as illustrated in FIG. 6, the first end portion 61 of the body 60 may be pivotally connected to the roller bracket 64 through a pivot pin 68, and the second end portion 62 of the body 60 may be fixed to the vehicle door 5. Thus, the vehicle door 5 may swing around the pivot pin 68 adjacent to the roller bracket 64. The body 60 may have a pivot lug 63 protruding from the first end portion 61 toward the roller bracket 64, and the roller bracket 64 may be connected to the pivot lug 63 through the pivot pin 68. The roller bracket 64 may be shaped so as not to interfere with the body 60 when the vehicle door 5 swings. The upper rotation axis CX1 and the lower rotation axis CX2 may be defined by the pivot pin 68. For example, the upper rotation axis CX1 and the lower rotation axis CX2 may be a virtual axis extending vertically along a center point of the pivot pin 68, and the upper rotation axis CX1 and the lower rotation axis CX2 may be vertically aligned, so that the vehicle door 5 may swing around the vertical rotation axis that virtually connects the upper rotation axis CX1 and the lower rotation axis CX2. The upper hold lock 31 may be fixed to the roller bracket 64 of the upper roller unit 21, and the lower hold lock 32 may be fixed to the roller bracket 64 of the lower roller unit 22.

When, by the hold operation of the actuator 43, the upper hold lock 31 firmly holds the roller bracket 64 of the upper roller unit 21 in the first closed position CP1 and the lower hold lock 32 firmly holds the roller bracket 64 of the lower roller unit 22 in the first closed position CP1, the vehicle door 5 may swing around the upper rotation axis CX1 of the upper roller unit 21 and the lower rotation axis CX2 of the lower roller unit 22 as illustrated in FIG. 7. The vehicle door 5 may move between the second closed position CP2 in which the vehicle door 5 is closed and the second open position OP2 in which the vehicle door 5 is opened. When the vehicle door 5 swings, another adjacent door 4 or other components may be spaced apart from the vehicle door 5 by a predetermined gap S1 so as not to interfere with the adjacent door 4 or the other components. For example, the vehicle door 5 may be a rear door, and another adjacent door 4 may be a front door.

According to the exemplary embodiment illustrated in FIGS. 6 and 7, as the pivot pin 68 is located between the roller bracket 64 and the first end portion 61 of the body 60, the rotation axes CX1 and CX2 of the vehicle door 5 may be relatively far from the vehicle door 5. Since a swing trajectory T1 and a rotation radius R1 of the vehicle door 5 are relatively increased, the gap S1 between the vehicle door 5 and the adjacent door 4 may be relatively increased. If the gap S1 between the vehicle door 5 and the adjacent door 4 is reduced, the vehicle door 5 may interfere with the adjacent door 4 when the vehicle door 5 moves toward the second open position OP2, and an open space created by the swing of the vehicle door 5 may be relatively narrowed since the swing trajectory T1 of the vehicle door 5 is relatively reduced.

Figure 8:
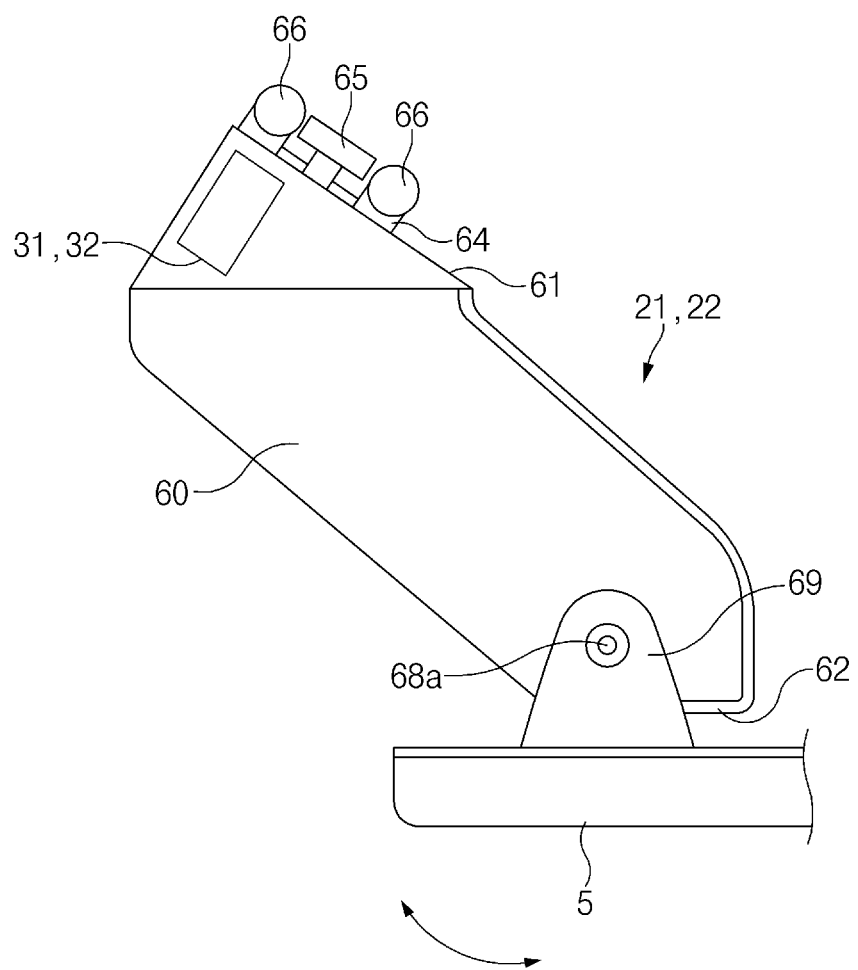
FIG. 8 illustrates an upper roller unit and a lower roller unit in a vehicle door opening and closing apparatus according to another exemplary embodiment of the present disclosure.

According to another exemplary embodiment, as illustrated in FIGS. 8 and 9, the first end portion 61 of the body 60 may be fixed to the roller bracket 64, and the second end portion 62 of the body 60 may be pivotally connected to the vehicle door 5 through a pivot pin 68a. Thus, the vehicle door 5 may swing around the pivot pin 68a adjacent to the second end portion 62 of the body 60.

Referring to FIGS. 8 and 9, the roller bracket 64 may be fixed to the first end portion 61 of the body 60 by welding, using fasteners, and/or the like, and the second end portion 62 of the body 60 may be pivotally connected to the vehicle door 5 through the pivot pin 68a. The vehicle door 5 may have a pivot lug 69 protruding toward the body 60, and the pivot lug 69 may be pivotally connected to the second end portion 62 of the body 60 through the pivot pin 68a. The second end portion 62 of the body 60 may be shaped so as not to interfere with the vehicle door 5 when the vehicle door 5 swings. The upper rotation axis CX1 and the lower rotation axis CX2 may be defined by the pivot pin 68a. For example, the upper rotation axis CX1 and the lower rotation axis CX2 may be a virtual axis extending vertically along a center point of the pivot pin 68a, and the upper rotation axis CX1 and the lower rotation axis CX2 may be vertically aligned, so that the vehicle door 5 may swing around the vertical rotation axis that virtually connects the upper rotation axis CX1 and the lower rotation axis CX2. The upper hold lock 31 may be fixed to the body 60 of the upper roller unit 21, and the lower hold lock 32 may be fixed to the body 60 of the lower roller unit 22.

Referring to FIG. 9, when the upper hold lock 31 firmly holds the roller bracket 64 of the upper roller unit 21 in the first closed position CP1, and the lower hold lock 32 firmly holds the roller bracket 64 of the lower roller unit 22 in the first closed position CP1, the vehicle door 5 may swing around the upper rotation axis CX1 of the upper roller unit 21 and the lower rotation axis CX2 of the lower roller unit 22. Thus, the vehicle door 5 may move between the second closed position CP2 in which the vehicle door 5 is closed and the second open position OP2 in which the vehicle door 5 is opened.

According to the exemplary embodiment illustrated in FIGS. 8 and 9, as the pivot pin 68a is located between the second end portion 62 of the body 60 and the vehicle door 5, the rotation axes CX1 and CX2 of the vehicle door 5 may be relatively close to the vehicle door 5. Since a rotation radius R2 of the vehicle door 5 is relatively shortened, a gap S2 between the vehicle door 5 and another adjacent door 4 may be relatively reduced, resulting in improved exterior styling. Even though the rotation axes CX1 and CX2 of the vehicle door 5 are close to the vehicle door 5, a swing trajectory T2 of the vehicle door 5 is not reduced, and thus an open space created by the swing of the vehicle door 5 may not be narrowed.

Figure 11:
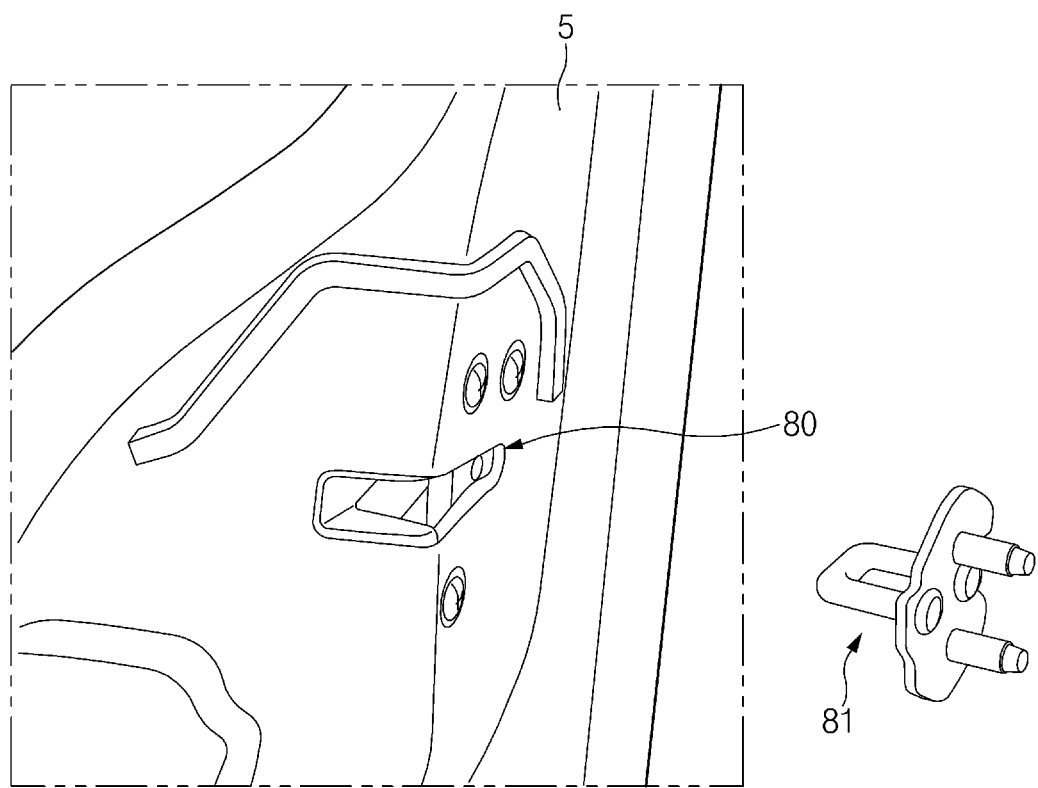
FIG. 11 illustrates a main latch mounted on a vehicle door and a main striker.

Referring to FIG. 11, the main latch 80 may be mounted on a rear end of the vehicle door 5, and the main striker 81 may be fixed to the vehicle body 1. The main latch 80 may releasably engage with the main striker 81. When the vehicle door 5 is in the first closed position CP1 or the second closed position CP2, the main latch 80 may engage with the main striker 81 by an engaging operation of the outside handle 6 so that the vehicle door 5 may be locked in the first closed position CP1 or the second closed position CP2. When the vehicle door 5 is in the first closed position CP1 or the second closed position CP2, the main latch 80 may release the main striker 81 as the outside handle 6 selectively moves in different directions (direction S and direction P in FIG. 2), so that the vehicle door 5 may be allowed to move in the sliding mode or the swing mode. When the vehicle door 5 is held in the first closed position CP1 and the main latch 80 releases the main striker 81, a center roller unit 23 may be released from the center rail 13, and thus the vehicle door 5 may be opened and closed in the swing mode.

The vehicle door opening and closing apparatus, according to exemplary embodiments of the present disclosure, may further include the center rail 13 mounted at a central portion of the vehicle body 1, and the center roller unit 23 guided along the center rail 13.

Referring to FIGS. 1 and 3, the center rail 13 may extend from a rear edge of the door aperture 3 along the longitudinal direction of the vehicle. The center roller unit 23 may be pivotally mounted at a central portion of the vehicle door 5. In particular, the center roller unit 23 may be mounted in a position adjacent to the rear end of the vehicle door 5. The center roller unit 23 may be guided along the center rail 13.

Figure 12:
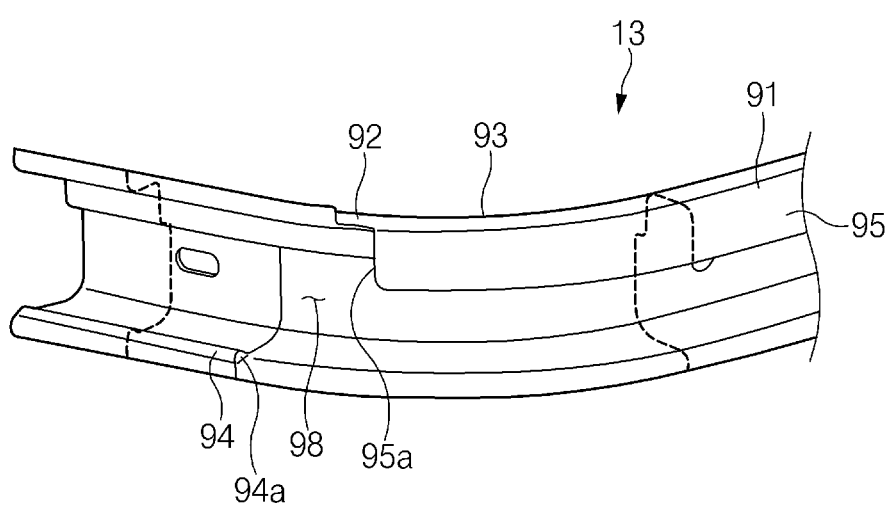
FIG. 12 illustrates a perspective view of a center rail in a vehicle door opening and closing apparatus according to an exemplary embodiment of the present disclosure.

Referring to FIG. 12, the center rail 13 may include a sliding guide 91 extending straightly in the longitudinal direction of the vehicle, and a swing guide 92 extending from the sliding guide 91 toward the interior side of the vehicle. The swing guide 92 may be bent at a predetermined angle with respect to the sliding guide 91 through a bending portion 93, and the bending portion 93 may be curved at a predetermined radius.

Figure 13:
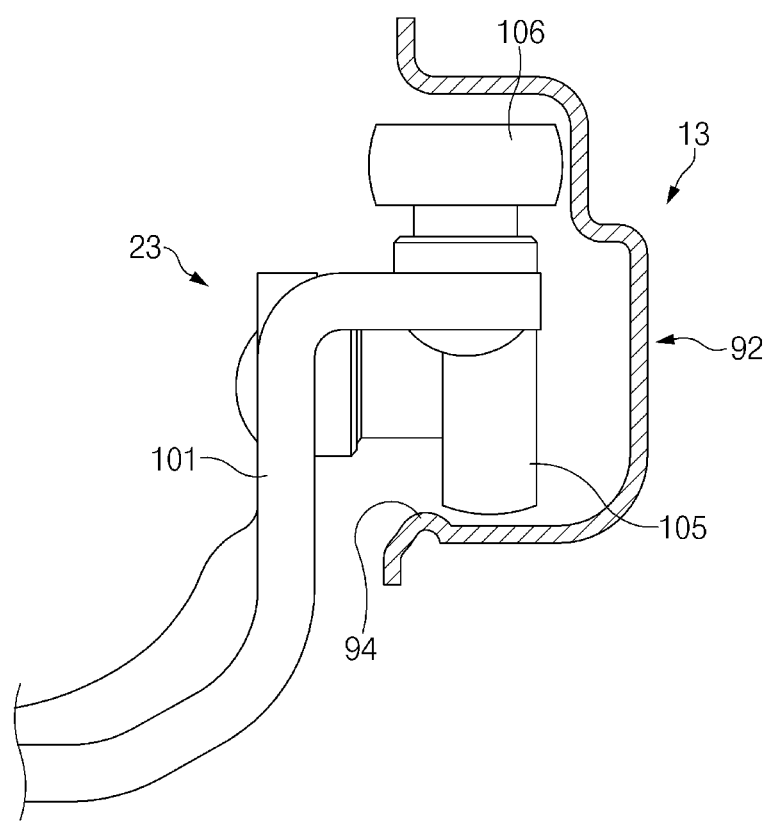
FIG. 13 illustrates a cross-sectional view of a swing guide of a center rail.
Figure 14:
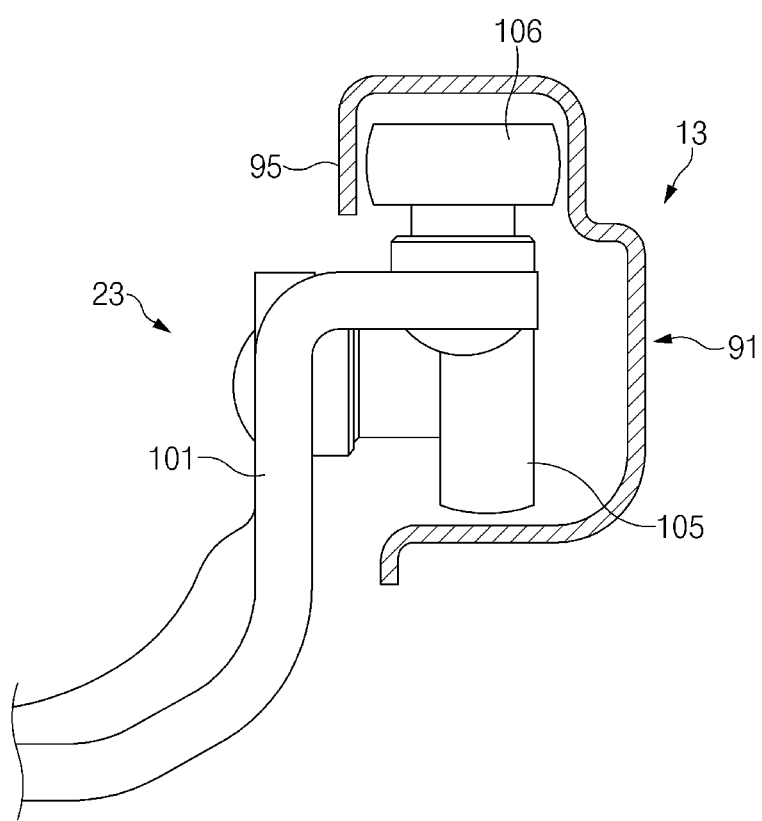
FIG. 14 illustrates a cross-sectional view of a sliding guide of a center rail.
Figure 15:
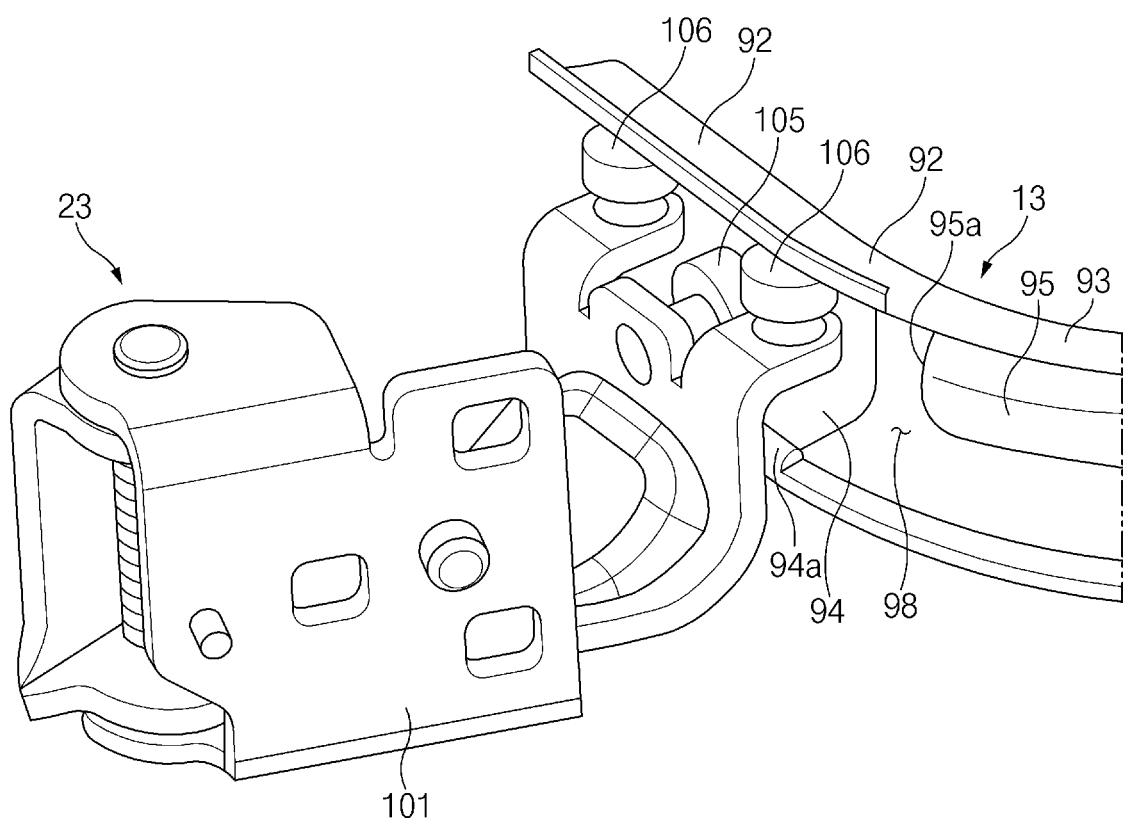
FIG. 15 illustrates a structure in which a center roller unit is held in a swing guide of a center rail.

Referring to FIGS. 13 to 15, the center roller unit 23 may include a roller bracket 101 and rollers 105 and 106 rotatably mounted on the roller bracket 101. The roller bracket 101 may be pivotally mounted at the central portion of the vehicle door 5. The rollers 105 and 106 may roll along the center rail 13. As illustrated in FIG. 15, a middle roller 105 and two side rollers 106 disposed on opposite sides of the middle roller 105 may be rotatably mounted on the roller bracket 101. A rotation axis of the middle roller 105 may be orthogonal to a rotation axis of the side roller 106.

When the vehicle door 5 slides in the longitudinal direction of the vehicle as the sliding mode is selected, the sliding guide 91 may guide the rollers 105 and 106 of the center roller unit 23.

Referring to FIGS. 12 and 14, the sliding guide 91 may include a stopper wall 95 preventing the rollers 105 and 106 of the center roller unit 23 from being separated from the sliding guide 91. The stopper wall 95 may extend along a length of the sliding guide 91 and a length of the bending portion 93. The stopper wall 95 may protrude vertically downward from the top of the sliding guide 91. As the stopper wall 95 closes an upper area of the sliding guide 91 and an upper area of the bending portion 93, the center roller unit 23 may be prevented from moving away from the sliding guide 91 toward the exterior side of the vehicle as illustrated in FIG. 14.

When the vehicle door 5 is opened and closed in the swing mode as the swing mode is selected, the swing guide 92 may guide the rollers 105 and 106 of the center roller unit 23 to be released from the center rail 13.

An exterior side of the swing guide 92 may be entirely opened toward the exterior space of the vehicle. A guide projection 94 may protrude upwardly from the bottom of the swing guide 92, and the guide projection 94 may extend along a length of the swing guide 92. When the vehicle door 5 swings from the second closed position CP2 to the second open position OP2 along the swing trajectory T1 or T2, the middle roller 105 of the center roller unit 23 may be guided along the guide projection 94 as illustrated in FIG. 13.

Figure 16:
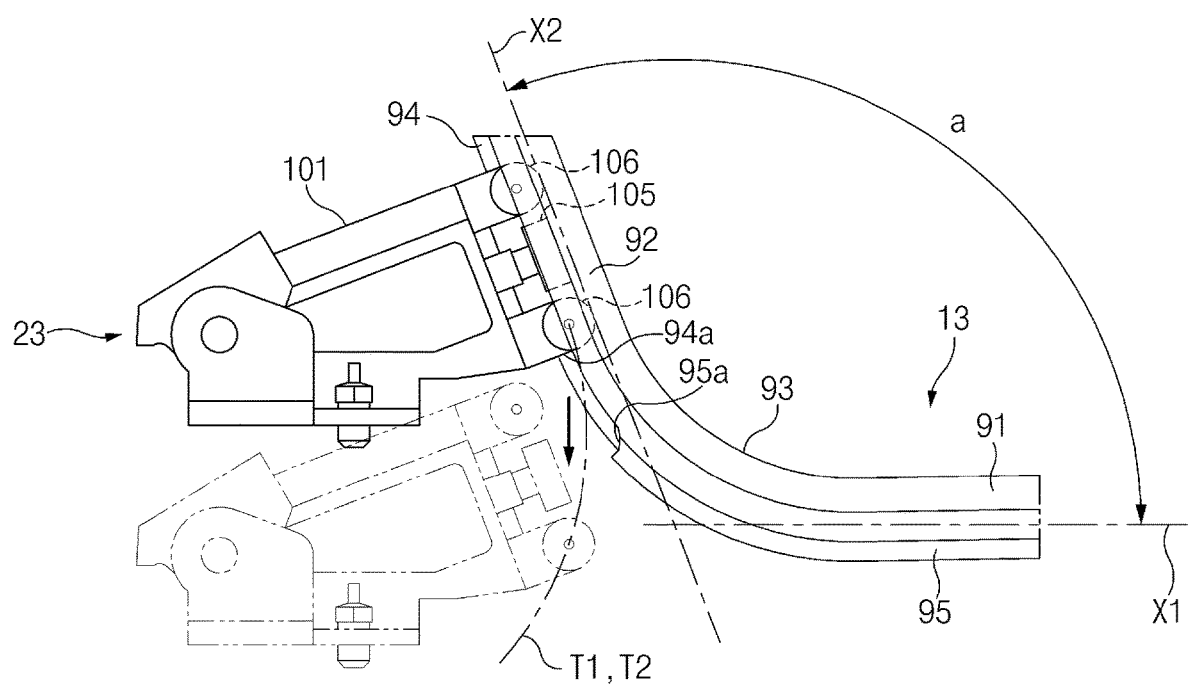
FIG. 16 illustrates an operation in which a center roller unit is released from a swing guide of a center rail.

A front end 95*a* of the stopper wall 95 of the sliding guide 91 and a rear end 94*a* of the guide projection 94 may be located so as not to interfere with the swing trajectories T1 and T2 of the vehicle door 5. In addition, as illustrated in FIG. 16, an axis X1 of the sliding guide 91 and an axis X2 of the swing guide 92 may intersect at a predetermined angle a. In particular, the angle a of intersection between the axis X1 of the sliding guide 91 and the axis X2 of the swing guide 92 may be an obtuse angle, so that the center roller unit 23 may easily be released from the swing guide 92 of the center rail 13 or may easily be held in the swing guide 92 of the center rail 13. The center rail 13 may include a space 98 allowing the rollers 105 and 106 of the center roller unit 23 to be released from the center rail 13 or be held in the center rail 13 when the vehicle door 5 swings in the swing mode. The space 98 may be defined between the front end 95*a* of the stopper wall 95 and the rear end 94*a* of the guide projection 94 as the front end 95*a* of the stopper wall 95 and the rear end 94*a* of the guide projection 94 are spaced apart from each other. Thus, there is no interference when the rollers 105 and 106 of the center roller unit 23 are released from the center rail 13 or are held in the center rail 13 in the swing mode.

Referring to FIG. 17, the outside handle 6 may include the handle base 110 mounted on the vehicle door 5, and the handle grip 120 movably mounted on the handle base 110.

The handle base 110 may be mounted on the vehicle door, and a main lever 130 may be rotatably mounted on the handle base 110. The main lever 130 may be operatively connected to the main latch 80 through a latch rod 135, and the rotation of the main lever 130 may allow the latch rod 135 to move so that the main latch 80 may engage with or release the main striker 81. That is, the latch rod 135 may lock or unlock the main latch 80 by the rotation of the main lever 130. A door module 85 may be adjacent to the main latch 80, and the door module 85 may be connected to the main latch 80.

Figure 23:
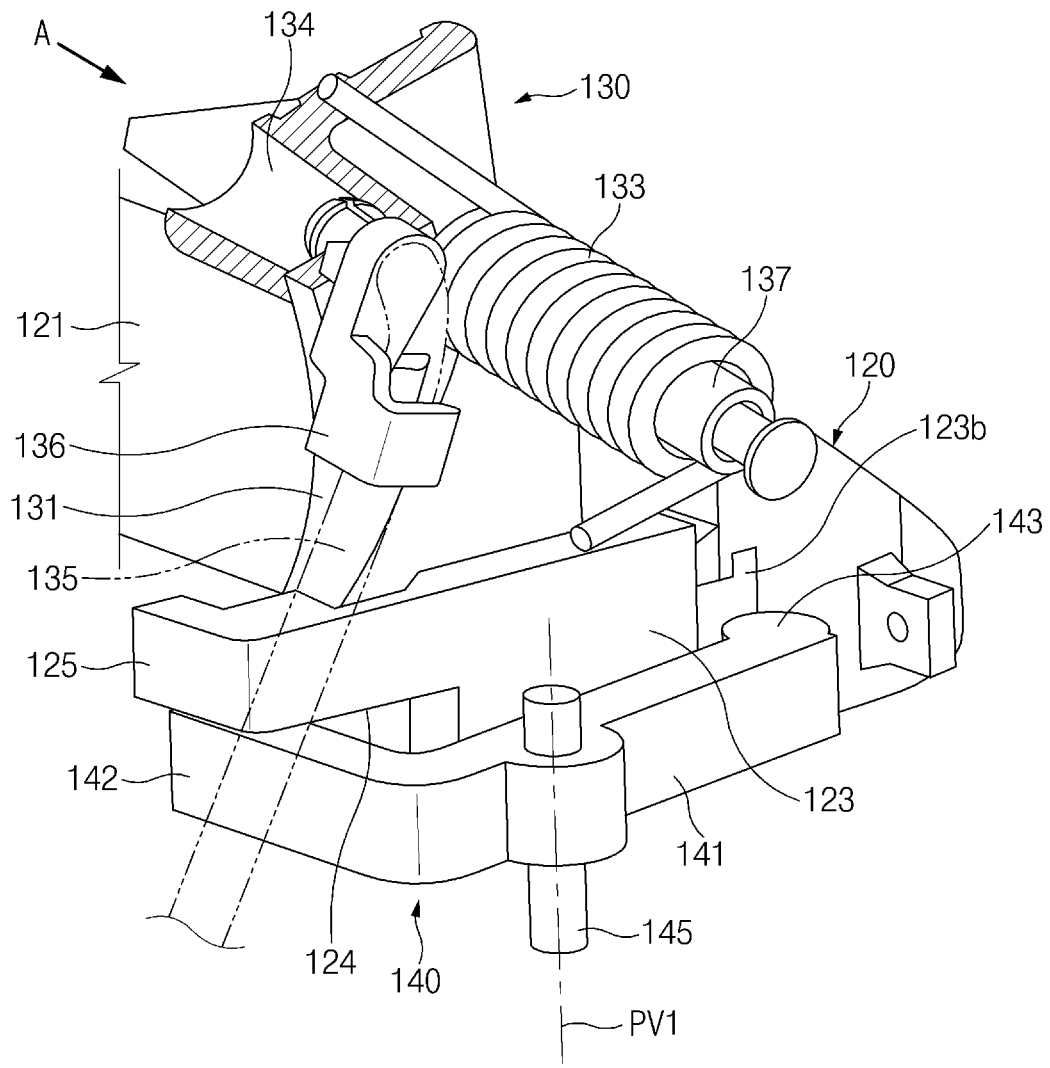
FIG. 23 illustrates a perspective view of a structure in which a first grip body and a second grip body of the handle grip illustrated in FIG. 22 are connected to the main lever.

Referring to FIGS. 17 and 23, the main lever 130 may include a balance weight 132, a shaft 137 rotatably supported to the handle base 110, a restoring spring 133 disposed around the shaft 137, and a boss 134 to which a top end of the latch rod 135 is coupled. The balance weight 132 may be located above the shaft 137, and the boss 134 may be located below the shaft 137. The top end of the latch rod 135 may be coupled to the boss 134 of the main lever 130 through an end fitting 136. The main lever 130 may rotate around the shaft 137. As the main lever 130 rotates, the latch rod 135 may move, and the movement of the latch rod 135 may allow the main latch 80 to engage with or release the main striker 81. When the user releases the outside handle 6, that is, when a force applied to the outside handle 6 is removed, the restoring spring 133 may restore the main lever 130 to its original position. The original position may be the locked position of the main latch 80 such that the main latch 80 engages with the main striker 81.

The handle grip 120 may be movable in different directions with respect to the handle base 110 of the vehicle. For example, the handle grip 120 may slide in the longitudinal direction of the vehicle (see direction S in FIG. 2), and pivot in the transverse direction of the vehicle (see direction P in FIG. 2).

Figure 18:
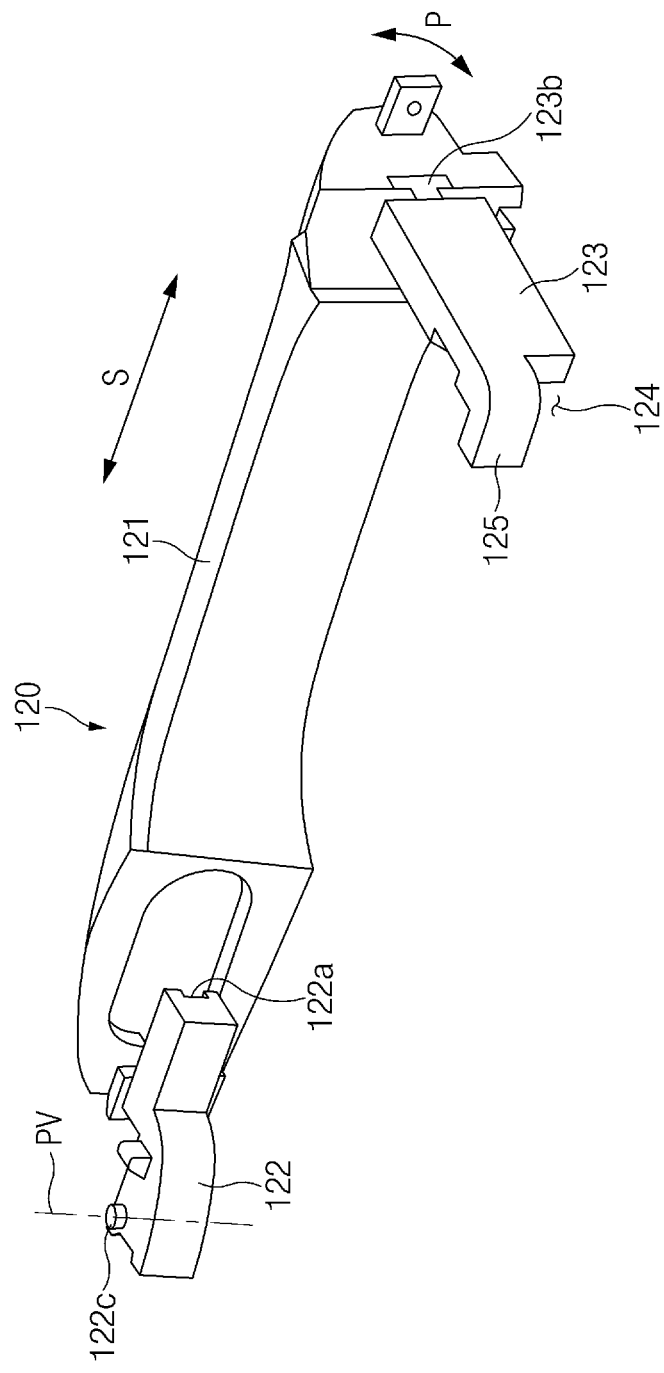
FIG. 18 illustrates a perspective view of a handle grip of the outside handle illustrated in FIG. 17.

Referring to FIG. 18, the handle grip 120 may include a first grip body 121, a second grip body 122 mounted on a first end portion of the first grip body 121, and a third grip body 123 mounted on a second end portion of the first grip body 121.

The first grip body 121 may be disposed to protrude from the handle base 110, and the first grip body 121 may be slidably mounted in the longitudinal direction (direction S) of the vehicle with respect to the handle base 110, and be pivotally mounted in the transverse direction (direction P) of the vehicle with respect to the handle base 110.

An axis of the second grip body 122 may be parallel to an axis of the first grip body 121, and an axis of the third grip body 123 may be orthogonal to the axis of the first grip body 121. The second grip body 122 and the third grip body 123 may be movably received in the handle base 110. The second grip body 122 and the third grip body 123 may move along the pivot direction P of the first grip body 121 within the handle base 110, but may not move along the sliding direction S of the first grip body 121.

Figure 19:
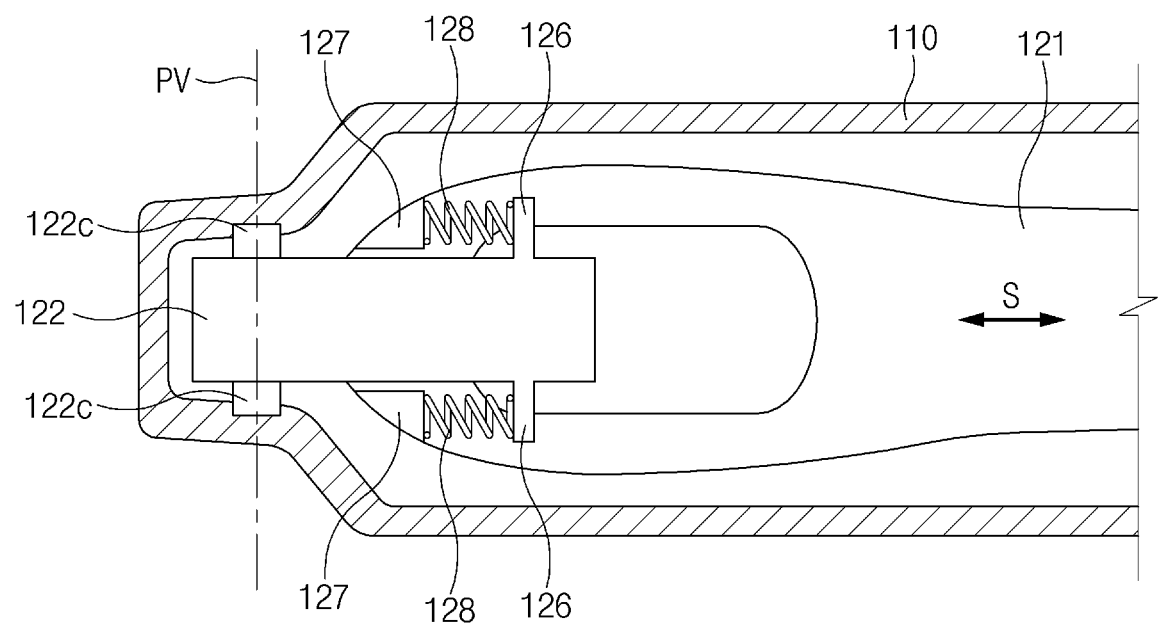
FIG. 19 illustrates a first grip body and a second grip body of the handle grip illustrated in FIG. 18.

As illustrated in FIGS. 18 and 19, the second grip body 122 may have a pair of pivot projections 122C, and the second grip body 122 may be pivotally mounted to the handle base 110 through the pair of pivot projections 122C. A virtual axis connecting the pair of pivot projections 122C may be a pivot axis PV of the second grip body 122. As the second grip body 122 pivots around the pivot projections 122C, the first grip body 121 and the third grip body 123 may pivot together.

The first grip body 121 may slide with respect to the second grip body 122 and the third grip body 123.

Figure 20:
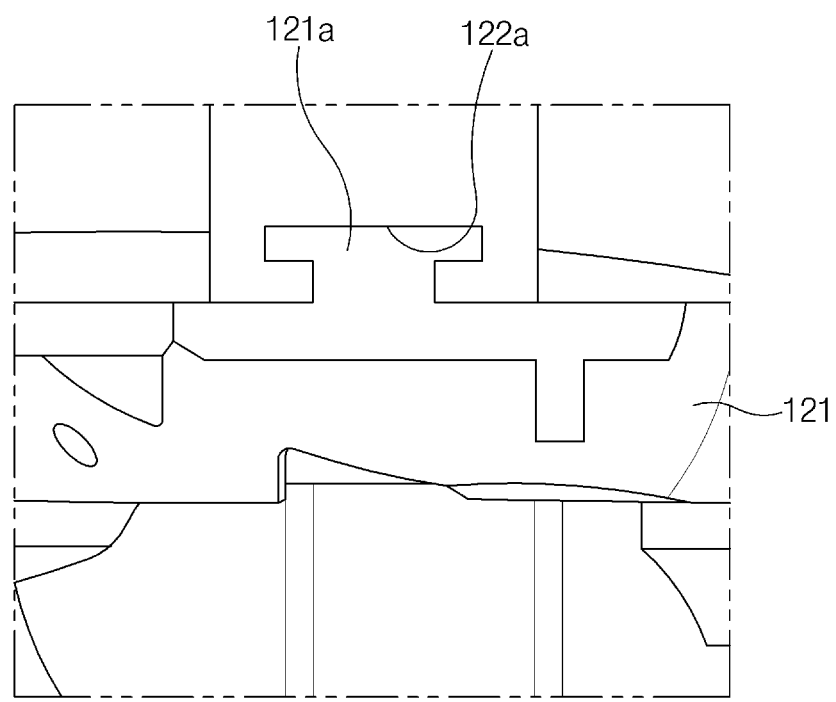
FIG. 20 illustrates a guide structure between the first grip body and the second grip body of the handle grip illustrated in FIG. 18.

Referring to FIG. 20, the first end portion of the first grip body 121 may have a guide 121a having a T-shaped cross section, the second grip body 122 may have a guide recess 122a receiving the guide 121a of the first grip body 121, and the guide recess 122a may have a T-shaped cross section corresponding to that of the guide 121a.

Figure 21:
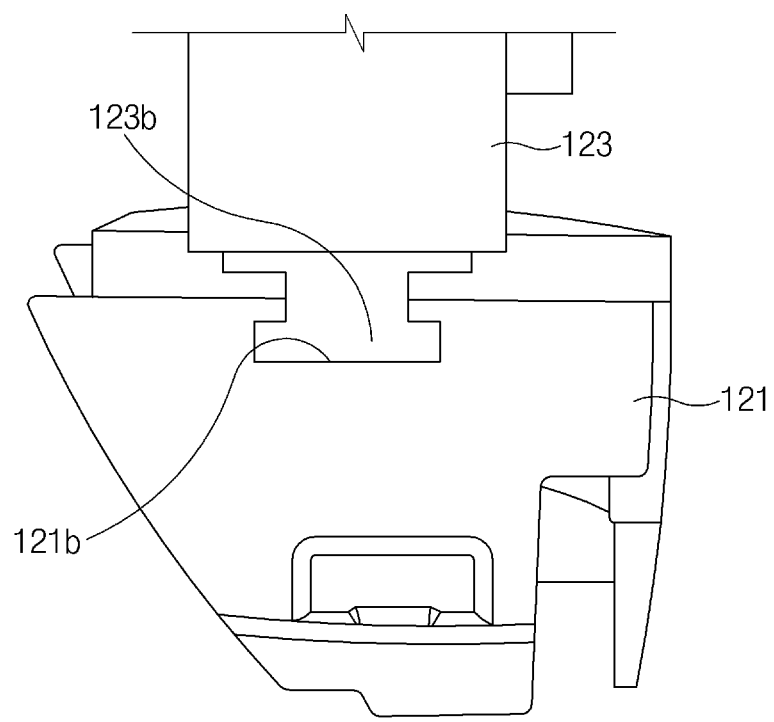
FIG. 21 illustrates a guide structure between the first grip body and a third grip body of the handle grip illustrated in FIG. 18.

Referring to FIG. 21, the third grip body 123 may have a guide 123b having a T-shaped cross section, the second end portion of the first grip body 121 may have a guide recess 121b receiving the guide 123b of the third grip body 123, and the guide recess 121b may have a T-shaped cross section corresponding to that of the guide 123b.

A return spring 128 may be disposed between the first grip body 121 and the second grip body 122. When the first grip body 121 slides by a force and the force is removed, the first grip body 121 may return to its original position by the return spring 128. Referring to FIG. 19, a first stopper 126 may protrude from a side surface of the second grip body 122, a second stopper 127 may protrude from a bottom surface of the first end portion of the first grip body 121, and the return spring 128 may be disposed between the first stopper 126 and the second stopper 127. In particular, as illustrated in FIG. 19, two return springs 128 may be disposed between the first grip body 121 and the second grip body 122.

Referring to FIG. 18, the third grip body 123 may have a first handle lever 125, and the first handle lever 125 may be operatively connected to the main latch 80 through the main lever 130. In particular, the first handle lever 125 may transmit the force by the pivot of the handle grip 120 to the main lever 130.

Figure 22:
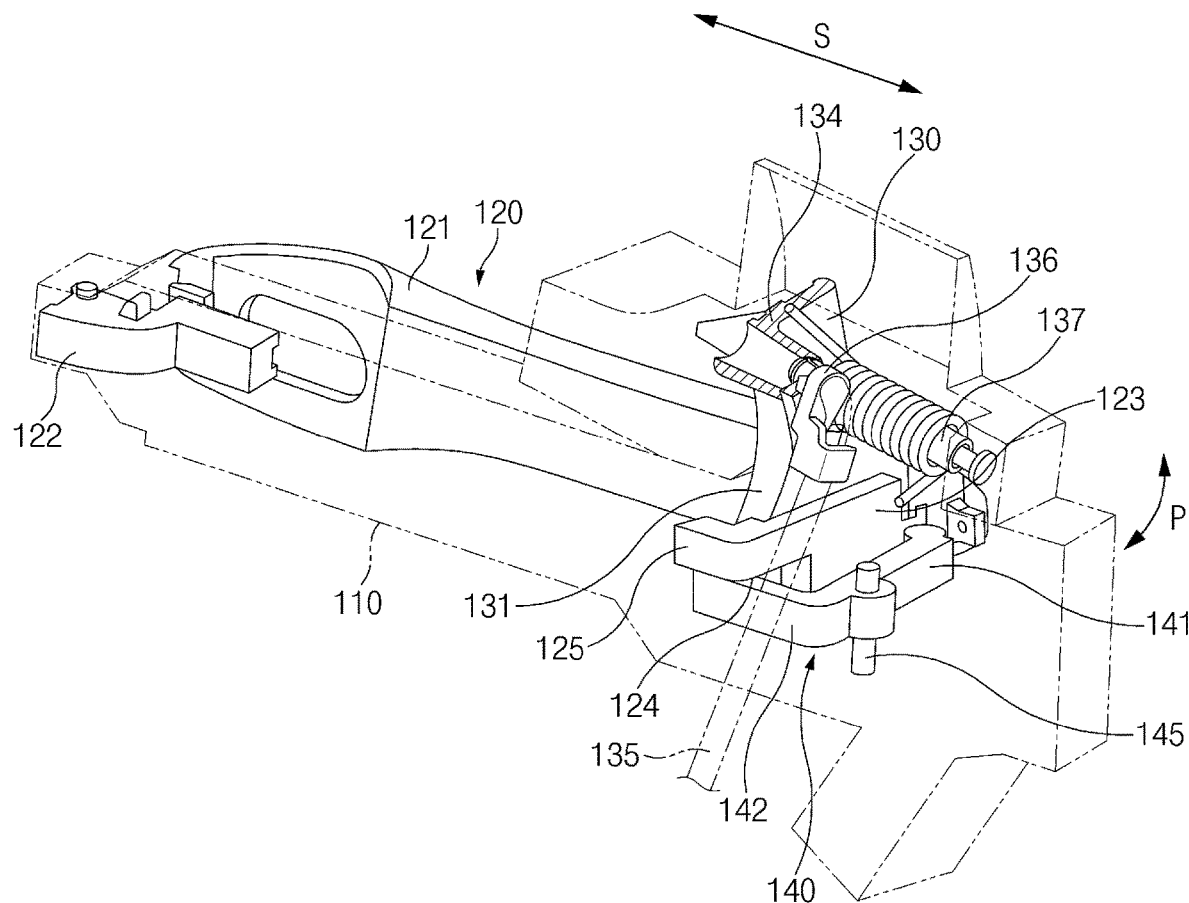
FIG. 22 illustrates a perspective view of a handle grip and a main lever according to an exemplary embodiment of the present disclosure.
Figure 24:
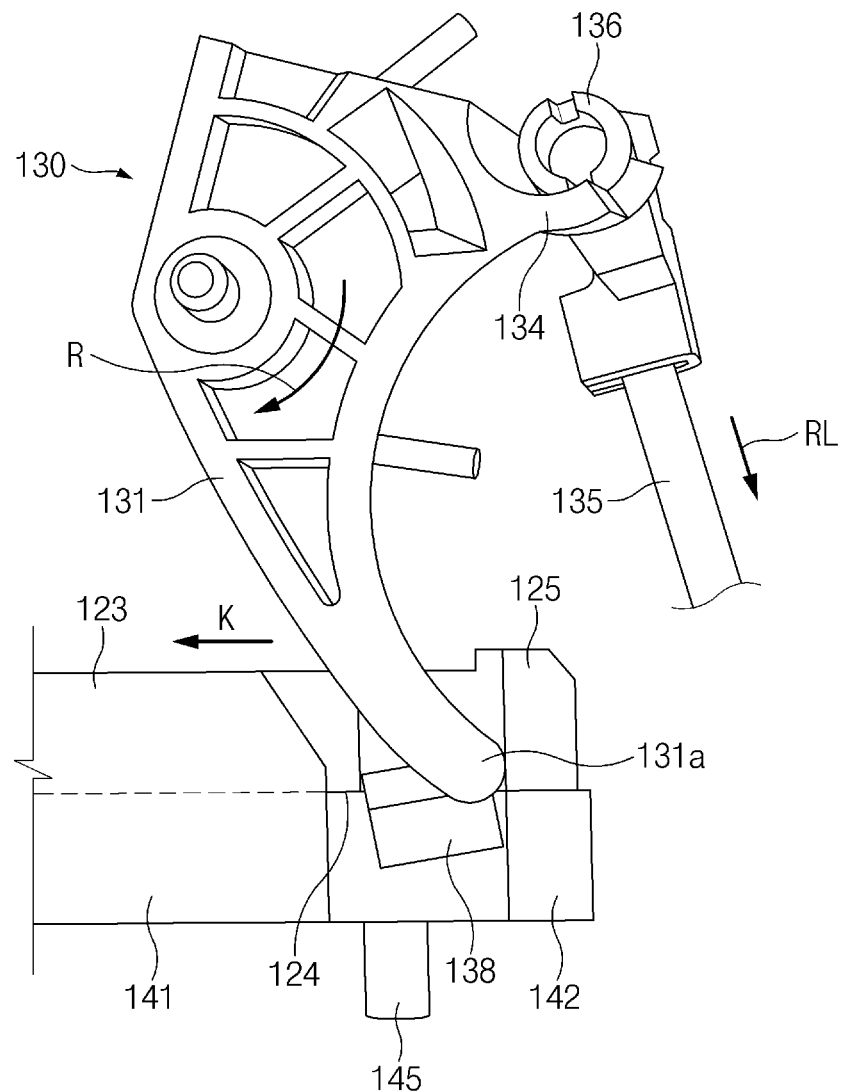
FIG. 24 illustrates a view, which is viewed from a direction indicated by arrow A of FIG. 23.
Figure 26:
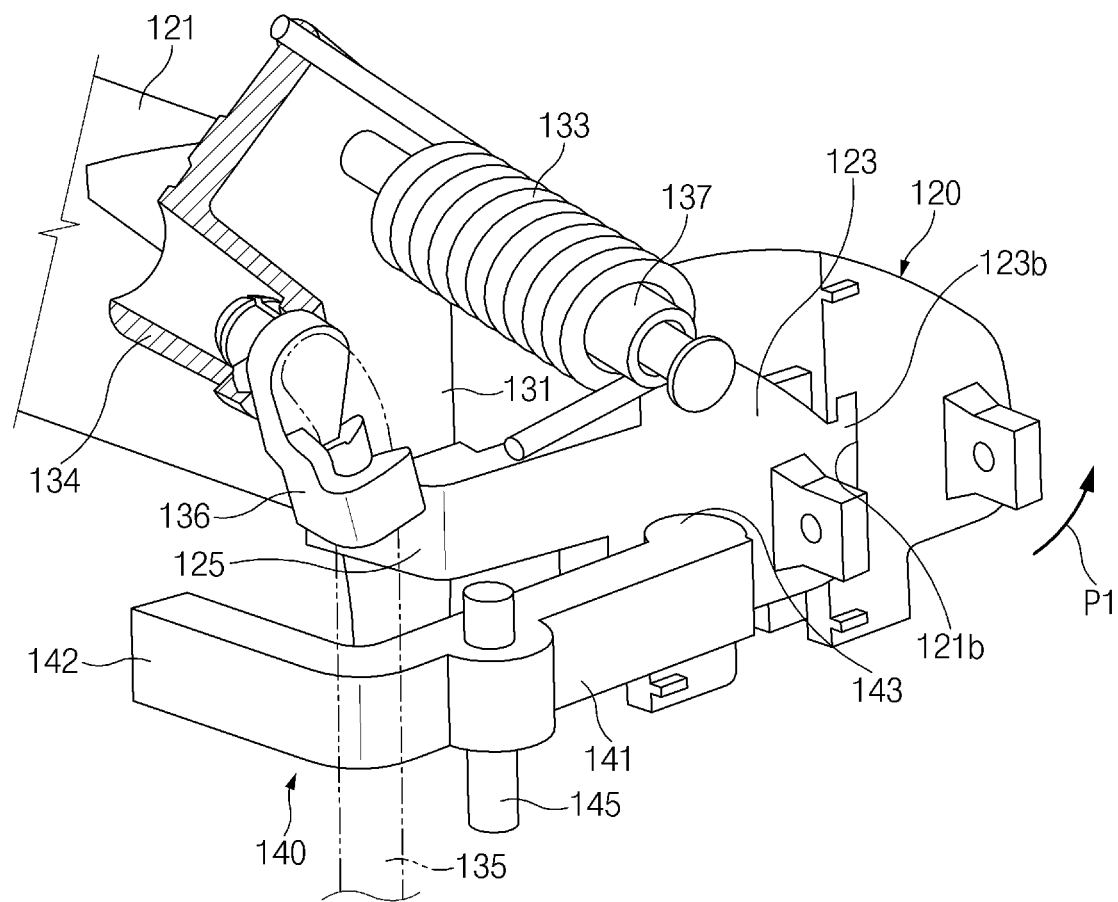
FIG. 26 illustrates a perspective view of an operation in which the main lever rotates when the first grip body of the handle grip illustrated in FIG. 23 pivots.

Referring to FIG. 22, the first handle lever 125 may extend from the third grip body 123 to the main lever 130, and an axis of the first handle lever 125 may be orthogonal to the axis of the third grip body 123. The first handle lever 125 may be operatively connected to the main lever 130. Referring to FIG. 24, the main lever 130 may have an extension portion 131 extending downwardly from the shaft 137. A bottom end 131a of the extension portion 131 may be contactable with the first handle lever 125. When the handle grip 120 pivots in the transverse direction of the vehicle, the main lever 130 may be rotated by the first handle lever or the restoring spring 133, and a rotation force of the main lever 130 may be transmitted to the main latch 80 through the latch rod 135, and thus the main latch 80 may engage with or release the main striker 81. Referring to FIG. 26, when the handle grip 120 pivots toward the exterior side of the vehicle (see direction P1 in FIG. 26), the first handle lever 125 may move in a direction of pushing the extension portion 131 of the main lever 130 toward the exterior side of the vehicle (see direction K in FIG. 24). As the main lever 130 rotates in a direction of pushing the latch rod 135 toward the main latch 80 (see direction R in FIG. 24), the latch rod 135 may move in a direction of unlocking the main latch 80 (see direction RL in FIG. 24), so that the main latch 80 releases the main striker 81.

Referring to FIGS. 22 to 26, the outside handle 6 according to exemplary embodiments of the present disclosure may further include a second handle lever 140, and the second handle lever 140 may be operatively connected to the first grip body 121 and the main lever 130. When the first grip body 121 slides, the second handle lever 140 may transmit the force applied by the first grip body 121 to the main lever 130. The first handle lever 125 may have a recess 124 through which the second handle lever 140 passes, and the second handle lever 140 may pass through the recess 124 of the first handle lever 125. Since the second handle lever 140 does not interfere with the first handle lever 125, the second handle lever 140 may rotate independently of the first handle lever 125.

The second handle lever 140 may be rotatably mounted on the handle base 110 through a hinge pin 145. An axis PV1 of the hinge pin 145 may be orthogonal to an axis of the shaft 137 of the main lever 130, and be parallel to the pivot axis PV of the second grip body 122.

Figure 25:
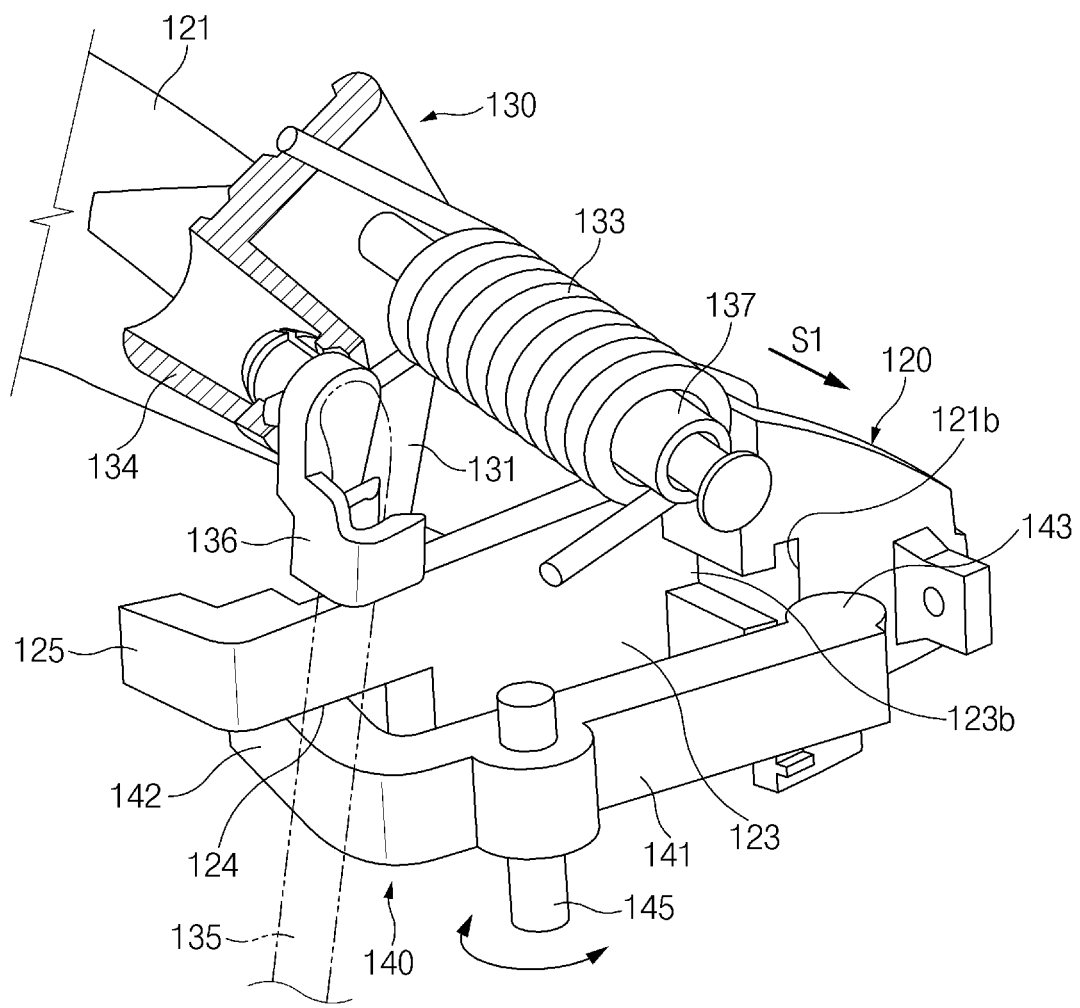
FIG. 25 illustrates a perspective view of an operation in which the main lever rotates when the first grip body of the handle grip illustrated in FIG. 23 slides.

The second handle lever 140 may have a first extension portion 141 extending in a direction orthogonal to the axis of the first grip body 121, and a second extension portion 142 extending in a direction orthogonal to an axis of the first extension portion 141. The hinge pin 145 may be located in a portion in which the first extension portion 141 and the second extension portion 142 are connected, and the second handle lever 140 may rotate around the hinge pin 145. The first extension portion 141 may be operatively connected to the second end portion of the first grip body 121. In particular, when the first grip body 121 slides, the first extension portion 141 may contact the second end portion of the first grip body 121 so that the second handle lever 140 may rotate around the hinge pin 145. The second extension portion 142 may be operatively connected to the bottom end 131a of the extension portion 131 of the main lever 130. In particular, when the second handle lever 140 rotates, the second extension portion 142 may rotate the main lever 130. Specifically, as illustrated in FIGS. 23 and 25, the first extension portion 141 may have a contact projection 143 directly contacting the second end portion of the first grip body 121, and when the first grip body 121 slides with respect to the second grip body 122 and the third grip body 123, the contact projection 143 of the first extension portion 141 may maintain contact with the second end portion of the first grip body 121. As illustrated in FIG. 24, the extension portion 131 of the main lever 130 may have a projection 138 protruding from the bottom end 131a thereof. The projection 138 of the main lever 130 may be contactable with the second extension portion 142. When the handle grip 120 slides in the longitudinal direction of the vehicle, the main lever 130 may be rotated by the second handle lever 140 or the restoring spring 133, and a rotation force of the main lever 130 may be transmitted to the main latch 80 through the latch rod 135, and thus the main latch 80 may engage with or release the main striker 81.

Referring to FIG. 25, when the first grip body 121 slides toward the rear of the vehicle (see direction S1 in FIG. 25), the first extension portion 141 of the second handle lever 140 contacting the second end portion of the first grip body 121 may move backwards, and as the second handle lever 140 may rotate around the hinge pin 145, the second extension portion 142 of the second handle lever 140 may move in a direction of pushing the extension portion 131 of the main lever 130 toward the exterior side of the vehicle (see direction K in FIG. 24). As the main lever 130 rotates in a direction of pushing the latch rod 135 toward the main latch 80 (see direction R in FIG. 24), the latch rod 135 may move in a direction of unlocking the main latch 80 (see direction RL in FIG. 24).

FIGS. 1 to 26 illustrate the vehicle door opening and closing apparatus according to exemplary embodiments of the present disclosure applied to the rear door 5. However, the vehicle door opening and closing apparatus according to exemplary embodiments of the present disclosure may be applied to various vehicle doors, such as front doors, in addition to rear doors.

Figure 27:
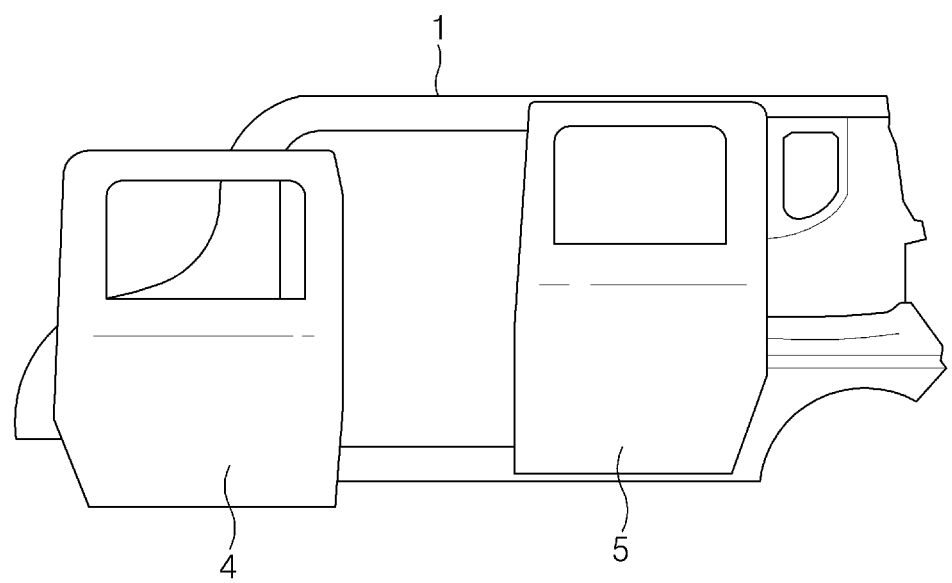
FIG. 27 illustrates a vehicle door opening and closing apparatus according to an exemplary embodiment of the present disclosure, which is applied to a front door of a vehicle, in a state in which the front door is opened in a sliding mode.
Figure 28:
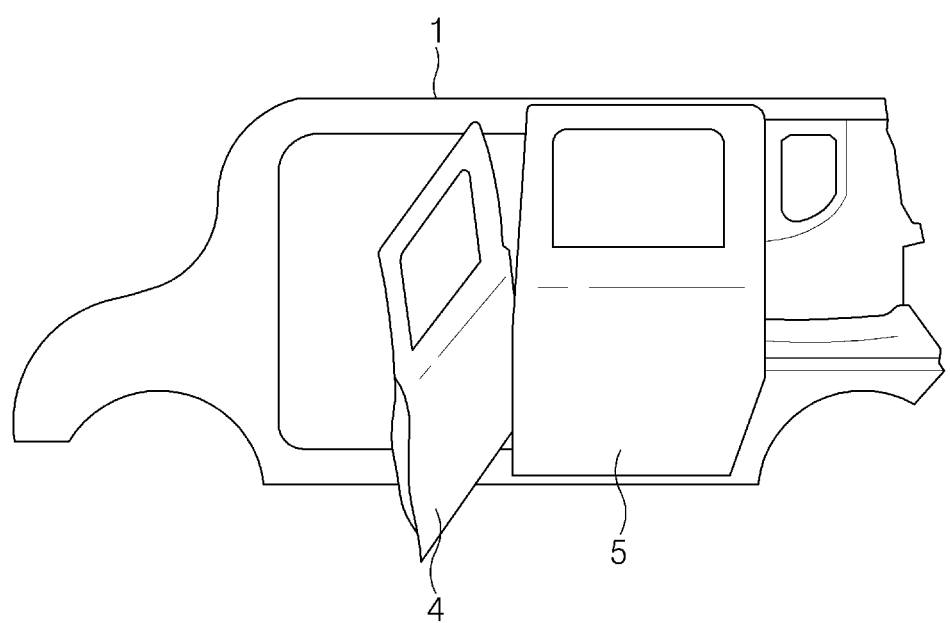
FIG. 28 illustrates a state in which the front door of FIG. 27 is opened in a swing mode.

FIGS. 27 and 28 illustrate the vehicle door opening and closing apparatus according to exemplary embodiments of the present disclosure applied to the front door 4. FIG. 27 illustrates a state in which the front door 4 is opened in the sliding mode, and FIG. 28 illustrates a state in which the front door 4 is opened in the swing mode.

Figure 29:
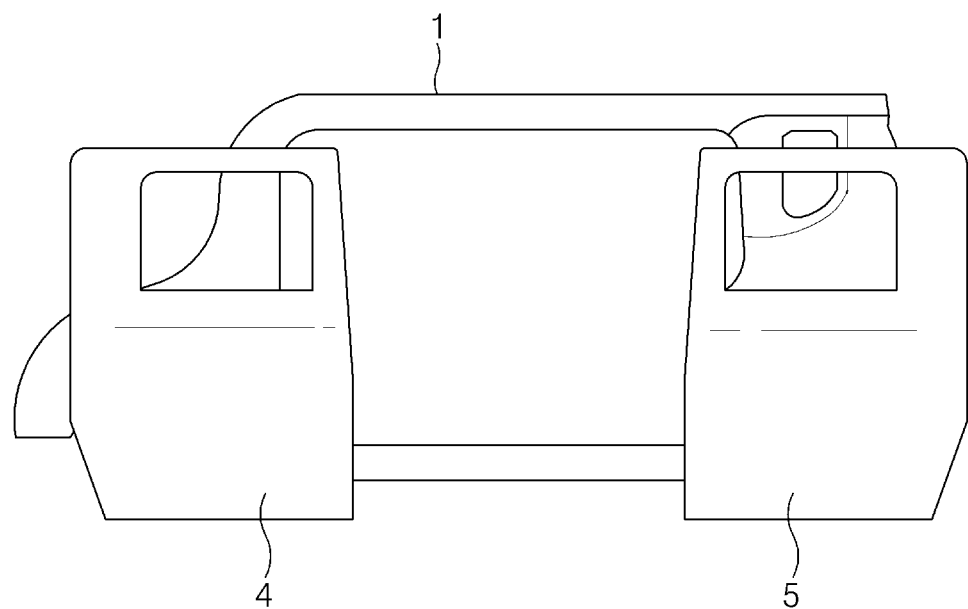
FIG. 29 illustrates a vehicle door opening and closing apparatus according to an exemplary embodiment of the present disclosure, which is applied to a front door and a rear door of a vehicle, in a state in which the front door and the rear door are opened in a sliding mode.
Figure 30:
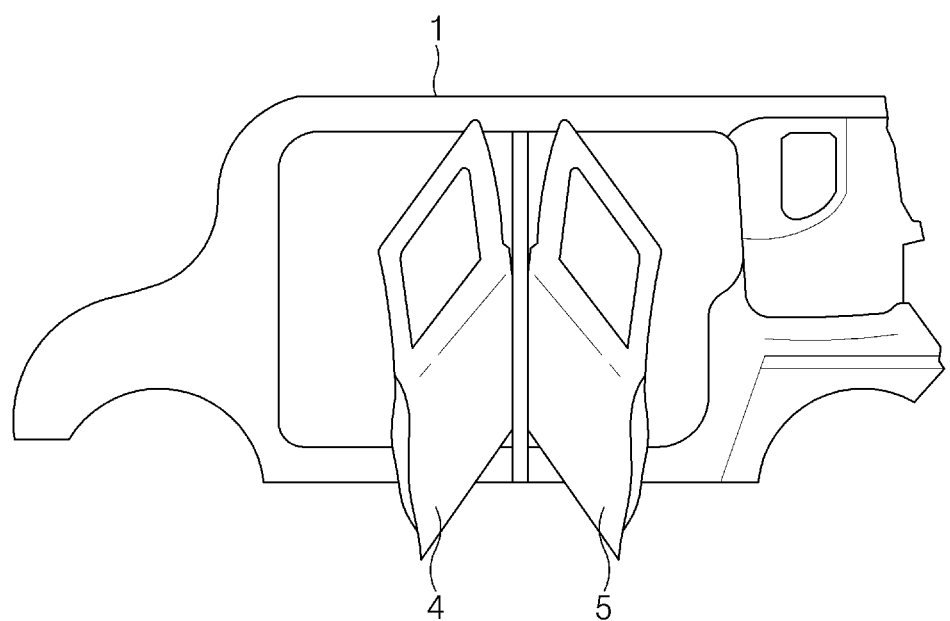
FIG. 30 illustrates a state in which the front door and the rear door of FIG. 29 are opened in a swing mode.

FIGS. 29 and 30 illustrate the vehicle door opening and closing apparatus according to exemplary embodiments of the present disclosure applied to both the front door 4 and the rear door 5. FIG. 29 illustrates a state in which the front door 4 and the rear door 5 are opened in the sliding mode, and FIG. 30 illustrates a state in which the front door 4 and the rear door 5 are opened in the swing mode.

As set forth above, the vehicle door opening and closing apparatus according to exemplary embodiments of the present disclosure may allow the vehicle door to open and close in one mode selected from the swing mode and the sliding mode, thereby satisfying the needs of customers. In particular, the outside handle may be allowed to operate in different motions, thereby enabling easy selection of the swing mode and the sliding mode.

In terms of vehicle specifications, the vehicle door opening and closing structure may be standardized, regardless of vehicle models. Thus, the manufacturing cost and investment cost may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle door opening and closing apparatus, comprising:
   a rail configured to be mounted on a vehicle body;
   a roller unit configured to be mounted on a vehicle door that has a main latch configured to releasably engage with a main striker mounted on the vehicle body, the roller unit configured to allow the vehicle door to open and close in a sliding mode, in which the vehicle door is configured to slide along the rail, and a swing mode, in which the vehicle door is configured to swing relative to the vehicle body; and
   an outside handle assembly configured to be operatively connected to the main latch, and including a handle base configured to be mounted on the vehicle door and a handle grip configured to be movably mounted on the handle base,
   wherein the handle grip is configured to slide in a longitudinal direction of the vehicle body to select the sliding mode, and to pivot in a transverse direction of the vehicle body to select the swing mode.

2. The vehicle door opening and closing apparatus according to claim 1, wherein:
   the handle grip includes a first grip body, a second grip body configured to be mounted on a first end portion of the first grip body, and a third grip body configured to be mounted on a second end portion of the first grip body; and
   the first grip body is configured to be slidable with respect to the handle base in the longitudinal direction of the vehicle body, and to be pivotal with respect to the handle base in the transverse direction of the vehicle body.

3. The vehicle door opening and closing apparatus according to claim 2, wherein the first grip body is configured to be slidable with respect to the second grip body and the third grip body.

4. The vehicle door opening and closing apparatus according to claim 3, wherein a return spring is disposed between the first grip body and the second grip body.

5. The vehicle door opening and closing apparatus according to claim 2, wherein the second grip body is configured to be pivotally mounted to the handle base.

6. The vehicle door opening and closing apparatus according to claim 5, wherein:
   the second grip body has a pair of pivot projections; and
   the second grip body is configured to be pivotally mounted to the handle base through the pair of pivot projections.

7. The vehicle door opening and closing apparatus according to claim 5, wherein the third grip body has a first handle lever configured to be operatively connected to the main latch.

8. The vehicle door opening and closing apparatus according to claim 7, wherein:
   a main lever is configured to be rotatably mounted on the handle base;
   the main lever is configured to be connected to the main latch through a latch rod; and
   the first handle lever is configured to be operatively connected to the main lever.

9. The vehicle door opening and closing apparatus according to claim 8, wherein a longitudinal axis of the first handle lever is configured to be orthogonal to a longitudinal axis of the third grip body.

10. The vehicle door opening and closing apparatus according to claim 8, wherein:
    the outside handle assembly further includes a second handle lever configured to be rotatably mounted on the handle base through a hinge pin; and
    the second handle lever is configured to transmit a force applied by the first grip body to the main lever when the first grip body slides.

11. The vehicle door opening and closing apparatus according to claim 10, wherein:

the second handle lever has a first extension portion configured to be operatively connected to the second end portion of the first grip body, and a second extension portion configured to be operatively connected to the main lever; and the second handle lever is configured to rotate as the first grip body slides.

12. The vehicle door opening and closing apparatus according to claim 11, wherein the first extension portion has a contact projection configured to contact the second end portion of the first grip body.

13. The vehicle door opening and closing apparatus according to claim 12, wherein a longitudinal axis of the first extension portion is configured to be orthogonal to a longitudinal axis of the first grip body.

14. The vehicle door opening and closing apparatus according to claim 12, wherein a longitudinal axis of the second extension portion is configured to be orthogonal to a longitudinal axis of the first extension portion.

15. The vehicle door opening and closing apparatus according to claim 1, wherein:

the roller unit has a rotation axis and includes a hold lock;

the roller unit is configured to be held at a predetermined position on the rail by the hold lock;

the vehicle door is configured to swing around the rotation axis when the roller unit is held in the predetermined position on the rail by the hold lock; and the vehicle door is configured to slide along the rail when the roller unit is released by the hold lock.

16. A vehicle comprising:

a vehicle body;

a vehicle door having a main latch releasably engagable with a main striker mounted on the vehicle body;

a rail mounted on the vehicle body;

a roller unit mounted on the vehicle door and configured to allow the vehicle door to open and close in a sliding mode, in which the vehicle door is configured to slide along the rail, and a swing mode, in which the vehicle door is configured to swing relative to the vehicle body; and an outside handle assembly operatively connected to the main latch, and including a handle base mounted on the vehicle door and a handle grip movably mounted on the handle base, wherein the handle grip is configured to slide in a longitudinal direction of the vehicle body to select the sliding mode, and to pivot in a transverse direction of the vehicle body to select the swing mode.

17. The vehicle according to claim 16, wherein:

the handle grip includes a first grip body, a second grip body mounted on a first end portion of the first grip body, and a third grip body mounted on a second end portion of the first grip body;

the first grip body is configured to be slidable with respect to the handle base in the longitudinal direction of the vehicle body, and to be pivotal with respect to the handle base in the transverse direction of the vehicle body;

the first grip body is configured to be slidable with respect to the second grip body and the third grip body; and a return spring is disposed between the first grip body and the second grip body.

18. The vehicle according to claim 16, wherein:

the handle grip includes a first grip body, a second grip body mounted on a first end portion of the first grip body, and a third grip body mounted on a second end portion of the first grip body;

the first grip body is configured to be slidable with respect to the handle base in the longitudinal direction of the vehicle body, and to be pivotal with respect to the handle base in the transverse direction of the vehicle body;

the second grip body is pivotally mounted to the handle base;

the second grip body has a pair of pivot projections and is pivotally mounted to the handle base through the pair of pivot projections;

the third grip body has a first handle lever operatively connected to the main latch;

a main lever is rotatably mounted on the handle base and connected to the main latch through a latch rod;

the first handle lever is operatively connected to the main lever; and a longitudinal axis of the first handle lever is orthogonal to a longitudinal axis of the third grip body.

19. The vehicle according to claim 16, wherein:

the handle grip includes a first grip body, a second grip body mounted on a first end portion of the first grip body, and a third grip body mounted on a second end portion of the first grip body;

the first grip body is configured to be slidable with respect to the handle base in the longitudinal direction of the vehicle body, and to be pivotal with respect to the handle base in the transverse direction of the vehicle body;

the second grip body is pivotally mounted to the handle base;

the second grip body has a pair of pivot projections and is pivotally mounted to the handle base through the pair of pivot projections;

the third grip body has a first handle lever operatively connected to the main latch;

a main lever is rotatably mounted on the handle base and connected to the main latch through a latch rod;

the first handle lever is operatively connected to the main lever;

the outside handle assembly further includes a second handle lever rotatably mounted on the handle base through a hinge pin; and the second handle lever has a first extension portion operatively connected to the second end portion of the first grip body, and a second extension portion operatively connected to the main lever, and the second handle lever is configured to transmit a force applied by the first grip body to the main lever when the first grip body slides and to rotate as the first grip body slides.

20. A vehicle comprising:

a vehicle body;

a vehicle door having a main latch releasably engagable with a main striker mounted on the vehicle body;

a rail mounted on the vehicle body;

a roller unit mounted on the vehicle door, the roller unit having a rotation axis and including a hold lock, the roller unit configured to be releasably or held at a predetermined position on the rail by the hold lock, the roller unit allows the vehicle door to open and close in a sliding mode, in which the vehicle door is configured to slide along the rail, and a swing mode, in which the vehicle door is configured to swing relative to the vehicle body; and an outside handle assembly operatively connected to the main latch, the outside handle assembly including a handle base mounted on the vehicle door and a handle grip movably mounted on the handle base, wherein the handle grip includes a first grip body, a second grip body mounted on a first end portion of the first grip body, and a third grip body mounted on a second end portion of the first grip body, wherein the first grip body is configured to slide with respect to the handle base in a longitudinal direction of the vehicle, and to pivot with respect to the handle base in a transverse direction of the vehicle, and wherein the handle grip slides in the longitudinal direction of the vehicle to select the sliding mode and the handle grip pivots in the transverse direction of the vehicle to select the swing made;

wherein the vehicle door is configured to swing around the rotation axis when the roller unit is held in the predetermined position by the hold lock; and wherein the vehicle door is configured to slide along the rail when the roller unit is released by the hold lock.

\* \* \* \* \*

UNITED STATES PATENT AND TRADEMARK OFFICE
CERTIFICATE OF CORRECTION

PATENT NO. : 11,745,568 B2
APPLICATION NO. : 17/014433
DATED : September 5, 2023
INVENTOR(S) : Je Won Choi It is certified that error appears in the above-identified patent and that said Letters Patent is hereby corrected as shown below:

In the Claims

In Column 19, in Claim 16, Line 32, delete "engagable" and insert -- engageable --.

In Column 20, in Claim 19, Line 41, delete "on" and insert -- to --.

In Column 20, in Claim 20, Line 52, delete "engagable" and insert -- engageable --.

In Column 20, in Claim 20, Line 57, after "releasably" delete "or".

In Column 21, in Claim 20, Line 11, delete "made;" and insert -- mode; --.

Signed and Sealed this
Twenty-first Day of May, 2024

Katherine Kelly Vidal
*Director of the United States Patent and Trademark Office*